United States Patent
Dong et al.

(10) Patent No.: US 10,203,835 B2
(45) Date of Patent: Feb. 12, 2019

(54) DISPLAY PROCESSING METHOD AND APPARATUS

(71) Applicants: Beijing Lenovo Software Ltd., Haidian District, Beijing (CN); Lenovo (Beijing) Co., Ltd., Haidian District, Beijing (CN)

(72) Inventors: Xiaoping Dong, Beijing (CN); Xingping Jiang, Beijing (CN); Renjie Wang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 81 days.

(21) Appl. No.: 14/138,445

(22) Filed: Dec. 23, 2013

(65) Prior Publication Data
US 2014/0181736 A1    Jun. 26, 2014

(30) Foreign Application Priority Data

Dec. 24, 2012 (CN) .......................... 2012 1 0567983
Dec. 24, 2012 (CN) .......................... 2012 1 0568528

(51) Int. Cl.
*G06F 3/0484* (2013.01)
*G06F 3/0481* (2013.01)

(52) U.S. Cl.
CPC .................................. *G06F 3/0481* (2013.01)

(58) Field of Classification Search
CPC .......................... G06F 3/04845; G06F 3/0481
See application file for complete search history.

(56) References Cited

U.S. PATENT DOCUMENTS

| 9,104,301 B2 | 8/2015 | Kim |
| 2004/0135824 A1* | 7/2004 | Fitzmaurice .......... G06F 3/0488 715/856 |

(Continued)

FOREIGN PATENT DOCUMENTS

| CN | 1833218 A | 9/2006 |
| CN | 101114224 A | 1/2008 |

(Continued)

OTHER PUBLICATIONS

Steele, "Sams Teach Yourself Microsoft Office Word 2003 in 24 Hours", published: 2003, Sams Publishing, 1st Edition. Relevant section: https://web.archive.org/web/20121023012748/http://flylib.com/books/en/3.213.1.19/1/.*

(Continued)

*Primary Examiner* — Kevin L Young
*Assistant Examiner* — Seth A Silverman
(74) *Attorney, Agent, or Firm* — Brinks Gilson & Lione; John C. Freeman

(57) ABSTRACT

A display processing method and apparatus applicable to an electronic device are described. The electronic device has a display area divided into a first area and a second area. The display processing method includes acquiring object information of an object to be displayed; acquiring display position information of the object; displaying the object in a first display mode when the display position information corresponds to the first area; and displaying the object in a second display mode when the display position information corresponds to the second area, the first display mode being different from the second display mode.

19 Claims, 20 Drawing Sheets

(56) References Cited

U.S. PATENT DOCUMENTS

| | | | |
|---|---|---|---|
| 2006/0143574 A1* | 6/2006 | Ito | G06F 3/04817 |
| | | | 715/800 |
| 2006/0184897 A1* | 8/2006 | Young Suk Lee | G06F 3/0482 |
| | | | 715/810 |
| 2008/0022228 A1* | 1/2008 | Kwon | G06F 3/04817 |
| | | | 715/838 |
| 2009/0037813 A1* | 2/2009 | Newman | G06F 3/04883 |
| | | | 715/702 |
| 2009/0228820 A1 | 9/2009 | Kim | |
| 2010/0293508 A1 | 11/2010 | Hwang | |
| 2011/0252375 A1* | 10/2011 | Chaudhri | G06F 3/04817 |
| | | | 715/835 |
| 2013/0219340 A1* | 8/2013 | Linge | G06F 3/04883 |
| | | | 715/834 |
| 2015/0286358 A1 | 10/2015 | Kim | |

FOREIGN PATENT DOCUMENTS

| | | |
|---|---|---|
| CN | 101527745 | 9/2009 |
| CN | 101771751 | 7/2010 |

OTHER PUBLICATIONS

First Office Action dated Jun. 17, 2016 out of Chinese priority Application No. 201210567983.8 (14 pages including English translation).

Second Office Action dated Feb. 8, 2017 (14 pages) out of Chinese priority Application No. 201210567983.8.

First Office Action dated Jul. 27, 2016 (31 pages including English translation) out of Chinese priority Application No. 201210568528.X.

* cited by examiner

DISPLAY PROCESSING METHOD AND APPARATUS

This application claims priority to Chinese patent application no. 201210567983.8 filed on Dec. 24, 2012 and also to Chinese patent application no. 201210568528.X filed on Dec. 24, 2012, the entire contents of which are incorporated herein by reference.

BACKGROUND

The present disclosure relates to a technical field of an electronic device, in particular to a display processing method and apparatus.

At present, an electronic device having a touch display screen, such as a panel personal computer, a large-size panel personal computer, a smart phone, a notebook computer and the like, has been increasingly popular. In each of these electronic devices, a display unit and a touch unit overlap to each other to form a touch display screen. A user controls an object displayed on the touch display screen by performing a hand gesture operation on the touch display screen.

However, on one hand, a display mode of an object is in general relatively fixed, instead of being different when the object is displayed on different areas of the touch display screen; on the other hand, an operation function corresponding to the object is also relatively fixed, instead of being different when the object is displayed on different areas of the touch display screen, such that operable functions of the object are single, so is the operation experience of the user.

Further, some of the electronic devices display a navigate icon as an upper operation object, so that the user can lead to a lower operation object by clicking the upper operation object. However, some operation objects on the navigate icon are hidden when the navigate icon moves to a position at edges of the display screen, resulting in that the user cannot make a click; or, the user clicks the upper operation object on the navigate icon, but a part or all of the lower operation object may be hidden in the original display mode. As a result, the user is prevented from viewing, and fails to make any operation.

In particular, in a case of the touch display screen with a large size, such as a desk-top touch display device, the requirement for giving different treatments to the object dependent upon different areas where the object is located is more urgent.

SUMMARY

In view of the above situation, the present disclosure provides a display processing method and apparatus capable of giving different treatments to the object dependent upon different areas where the object is located, thus diversifying display modes and function modes of the object and greatly improving the user's experience.

According to one embodiment of the present disclosure, there is provided a display processing method applicable to an electronic device. The electronic device has a display area being divided into a first area and a second area. The display processing method comprises: acquiring object information of an object to be displayed; acquiring display position information of the object; displaying the object in a first display mode when the display position information corresponds to the first area; and displaying the object in a second display mode when the display position information corresponds to the second area, the first display mode being different from the second display mode.

In an example, in the first display mode, the object is displayed in the first area with a first display size; in the second display mode, the object is displayed in the second area with a second display size, the first display size being larger than the second display size.

In an example, in the first display mode, a plurality of display elements of the object are displayed in the first area with a first layout; in the second display mode, at least a part of the plurality of display elements of the object are displayed in the second area with a second layout.

In an example, in the first display mode, the object is displayed in the first area in a first operation form; in the second display mode, the object is displayed in the second area in a second operation form, the number of operable controls included in the first operation form being greater than the number of operable controls included in the second operation form.

In an example, in the first display mode, at least a first part of the object is displayed in the first area; in the second display mode, at least a second part of the object is displayed in the second area, the first part being larger than the second part.

In an example, the second area is subdivided into a first subarea and a second subarea, and when the display position information corresponds to the second area, displaying the object in the second area in the second display mode comprises: judging whether the display position information corresponds to the first subarea, and displaying the object in the second subarea in the second display mode when it is judged that the display position information corresponds to the first subarea.

In an example, the first area is a non-edge area of the display area, and the second area is an edge area of the display area.

In an example, a first operation window is displayed on the display area and is arranged with M first operation objects of which an $i^{th}$ first operation object corresponds to a second operation window, and there are N second operation objects arranged on the second operation window, wherein M is an integer equal to or greater than 1, N is an integer equal to or greater than 1, and i is an random integer from 1 to M, and wherein the object to be displayed is the second operation window, and the first operation window provides the display position information of the object to be displayed. The method comprises:

displaying the second operation window in the first display mode when the first operation window is in the first area of the display unit and there is a need for displaying the second operation window;

displaying the second operation window in the second display mode when the first operation window is in the second area of the display unit and there is a need for displaying the second operation window, such that the second operation window is able to be fully displayed on the display area; wherein the first area and the second area are not overlapped.

In an example, the displaying the second operation window in the second display mode comprises: judging whether a display position of the second operation window is beyond the display area; adjusting the display position of the second operation window when the display position of the second operation window is beyond the display area, such that the second operation window is able to be fully on displayed in the display area, wherein the adjusting the display position of the second operation window is: rotating the first operation window and the second operation window simultaneously and keeping a relative position of the second operation window and the $i^{th}$ first operation object unchanged; or rotating the second operation window around the center of the first operation window, thus the relative position of the second operation window and the $i^{th}$ first operation object being changed.

In an example, the displaying the second operation window in the second display mode comprises: acquiring a first operation; rotating the first operation window in response to the first operation, such that the $i^{th}$ first operation object is moved to a first predetermined position; determining the display position of the second operation window based on the first predetermined position and a display direction of the $i^{th}$ first operation object; displaying the second operation window at the display position, a display direction of a $q^{th}$ second operation object of the N second operation objects being consistent with the display direction of the $i^{th}$ first operation object, wherein q is an integer equal to or greater than 1 and equal to or less than N. Optionally, a connecting line between the first predetermined position and the center of the first operation window is in parallel to or at a 45-degree angle with the edge of the display area.

In an example, the displaying the second operation window in the first display mode comprises: determining the second operation window based on the display position and display direction of the $i^{th}$ first operation object on the display unit; displaying the second operation window, the display direction of a $q^{th}$ second operation object of the N second operation objects being consistent with the display direction of the $i^{th}$ first operation object, wherein q is an integer equal to or greater than 1 and equal to or less than N; wherein the display position of the $i^{th}$ first operation object is a first display position and the display direction of the $i^{th}$ first operation object is a first display direction when the first operation window is at a first position of the first area; the display position of the $i^{th}$ first operation object is a second display position and the display direction of the $i^{th}$ first operation object is a second display direction when the first operation window is at a second position of the first area, the first display direction being different from the second display direction.

In an example, the display processing method further comprises: acquiring the user's operation information for the object; performing a first operation corresponding to the operation information in a first operation function set on the object when the display position information corresponds to the first area; performing a second operation corresponding to the operation information in a second operation function set on the object when the display position information corresponds to the second area, the first operation function set being different from the second operation function set.

In an example, functions corresponding to the first operation function set are more than functions corresponding to the second operation function set.

According to another embodiment of the present disclosure, there is provided a display processing apparatus applicable to an electronic device. The electronic device has a display area being divided into a first area and a second area. The display processing apparatus comprises: an object information acquiring unit for acquiring object information of an object to be displayed; a position information acquiring unit for acquiring display position information of the object; a display processing unit for displaying the object in a first display mode when the display position information corresponds to the first area and displaying the object in a second display mode when the display position information corresponds to the second area, the first display mode being different from the second display mode.

In an example, in the first display mode, the display processing unit displays the object in the first area with a first display size; in the second display mode, the display processing unit displays the object in the second area with a second display size, the first display size being larger than the second display size.

In an example, in the first display mode, the display processing unit displays a plurality of display elements of the object in the first area with a first layout; in the second display mode, the display processing unit displays at least a part of the plurality of display elements of the object in the second area with a second layout.

In an example, in the first display mode, the display processing unit displays the object in the first area in a first operation form; in the second display mode, the display processing unit displays the object in the second area in a second operation form, the number of operable controls included in the first operation form being greater than the number of operable controls included in the second operation form.

In an example, in the first display mode, the display processing unit displays at least a first part of the object in the first area; in the second display mode, the display processing unit displays at least a second part of the object the second area; the first part being larger than the second part.

In an example, the second area is subdivided into a first subarea and a second subarea, and the display processing comprises: a judging unit for judging whether the display position information corresponds to the first subarea when the display position information corresponds to the second area; a processing unit for displaying the object in the second subarea in the second display mode when it is judged that the display position information corresponds to the first subarea.

In an example, a first operation window is displayed in the display area and is arranged with M first operation objects of which an $i^{th}$ first operation object corresponds to a second operation window, and there are N second operation objects arranged on the second operation window, wherein M is an integer equal to or greater than 1, N is an integer equal to or greater than 1, and i is an random integer from 1 to M, wherein the object to be displayed is the second operation window, and the first operation window provides the display position information of the object to be displayed, and wherein the display processing unit controls the second operation window to be displayed in the first display mode when the first operation window is in the first area of the display unit and there is a need for displaying the second operation window; the display processing unit controls the second operation window to be displayed in the second display mode when the first operation window is moved from the first area of the display unit to the second area of the display unit and there is a need for displaying the second operation window, such that the second operation window is able to be fully displayed on the display area; wherein the first area and the second area are not overlapped.

In an example, the display processing unit controls the second operation window to be displayed in the second display mode comprises: the display processing unit judges whether a display position of the second operation window is beyond the display area; the display processing unit adjusts the display position of the second operation window when the display position of the second operation window is beyond the display area, such that the second operation window is able to be fully displayed on the display area, wherein the display processing unit adjusts the display position of the second operation window by one of the following manners: rotating the first operation window and the second operation window simultaneously and keeping a relative position of the second operation window and the $i^{th}$ first operation object unchanged; or rotating the second operation window around the center of the first operation window, thus the relative position of the second operation window and the $i^{th}$ first operation object being changed.

In an example, the display processing apparatus further comprises a detecting unit for detecting whether there is a first operation; wherein the display processing controls the second operation window to be displayed in the second display mode comprises: the display processing unit rotates the first operation window in response to the first operation, such that the $i^{th}$ first operation object is moved to a first predetermined position; determines the display position of the second operation window based on the first predetermined position and a display direction of the $i^{th}$ first operation object, and displays the second operation window at the display position, a display direction of a $q^{th}$ second operation object of the N second operation objects being consistent with the display direction of the $i^{th}$ first operation object, wherein q is an integer equal to or greater than 1 and equal to or less than N. Optionally, a connecting line between the first predetermined position and the center of the first operation window is in parallel to or at a 45-degree angle with the edge of the display area.

In an example, the display processing unit controls the second operation window to be displayed in the first display mode comprises: the display processing unit determines the second operation window based on the display position and display direction of the $i^{th}$ first operation object on the display unit, and displays the second operation window, the display direction of a $q^{th}$ second operation object of the N second operation objects being consistent with the display direction of the $i^{th}$ first operation object, wherein q is an integer equal to or greater than 1 and equal to or less than N; wherein the display position of the $i^{th}$ first operation object is a first display position and the display direction of the $i^{th}$ first operation object is a first display direction when the first operation window is at a first position of the first area; the display position of the $i^{th}$ first operation object is a second display position and the display direction of the $i^{th}$ first operation object is a second display direction when the first operation window is at a second position of the first area, the first display direction being different from the second display direction.

In an example, the display processing apparatus further comprises: an operation information acquiring unit for acquiring the user's operation information for the object; an operation processing unit for performing a first operation corresponding to the operation information in a first operation function set on the object when the display position information corresponds to the first area and performing a second operation corresponding to the operation information in a second operation function set on the object when the display position information corresponds to the second area, the first operation function set being different from the second operation function set.

According to the embodiments of the present disclosure, the display processing method and apparatus acquire the display position information of the object and perform a corresponding display mode and operation mode according to the display position information of the object, so as to be capable of giving different treatments to the object dependent upon different areas where the object is located, thus diversifying display modes and function modes of the object and greatly improving the user's experience.

BRIEF DESCRIPTION OF THE DRAWINGS

Drawings are used to give a further understanding of the present disclosure, are composed of one part of the specification and are used to explain the present disclosure in combination with the embodiments of the present disclosure, thus not being regarded as limitations to the present disclosure.

DETAILED DESCRIPTION

Respective embodiments of the present disclosure will be described in detail with reference to the accompanying figures. Herein, it should be noted that, in the accompanying figures, the same reference mark is given to the component parts that basically possess the same or similar structures and functions, and the repetitive description thereabout will be omitted.

The display processing method according to an embodiment of the present disclosure is applicable to an electronic device. The electronic device may be a portable electronic device such as a smart phone, a panel personal computer, a personal computer and the like. The electronic device may also be a large electronic device such as a desk-top computer and the like.

The electronic device has a display unit for displaying an object. The object may be a picture or a file stored in the electronic device, or may be a display interface of a system application or an user application installed in the electronic device and its controls, or may also be a display interface of a navigate icon of the electronic device.

In addition, the electronic device further has a touch unit for receiving a hand gesture operation of the user. The touch unit may be formed in various ways such as a resistive unit, a capacitive sensor and the like.

Optionally, the display unit and the touch unit overlap to each other to form a touch display unit (called as a touch display screen in appropriate). The user can intuitively control the object by performing a hand gesture operation on the object displayed on the touch display unit.

The (touch) display unit has a display area which can be divided into a first area and a second area.

In an example, the second area surrounds the first area. In particular, the first area may be a non-edge area of the display area while the second area may be an edge area of the display area. Distances between respective sides of the non-edge area and corresponding boundaries of the display area exceed predetermined distances respectively. Accordingly, outside boundaries of the edge area are corresponding boundaries of the display area respectively, and distances between inside boundaries of the edge area and the corresponding boundaries of the display area are greater than the predetermined distances respectively.

Below will be a description by taking the first area being the non-edge area and the second area being the edge area as an example. Of course, division of the first area and the second area are just for illustrating. Those skilled in the art can divide the display area into a random first area and second area according to the requirements for designing.

Below will be a description of a display processing method applicable to the electronic device with reference to FIG. 1.

Figure 1:
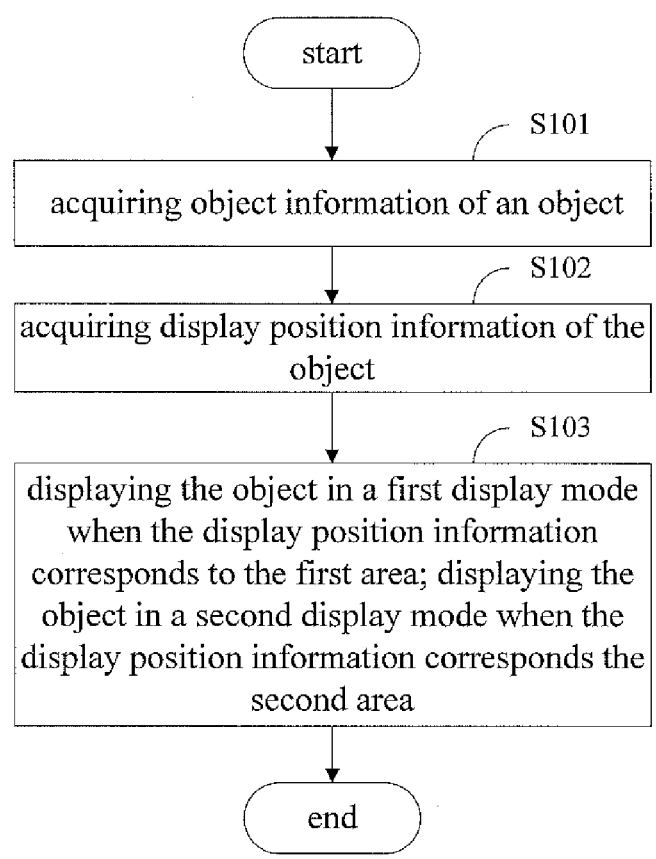
FIG. 1 is a flow chart illustrating a display processing method according to an embodiment of the present disclosure.

As shown in FIG. 1, when the display processing method of the embodiment of the present disclosure starts, firstly the display processing method acquires object information of an object at step S101.

The object information of the object is information required for displaying the object. In particular, for example, in a case of the object being a picture, a file and the like, the object information may be content information of the file. In a case of the object being an application, the objection information may be information of display controls and display elements comprised in the application. More particularly, for example, in a case of the object being a menu (for example, a navigate icon) of an operation system of the electronic device, the object information may comprise information related to options comprised in the menu, such as information of an application icon (a navigate icon) and the like.

Next, at step S102, the display processing method acquires display position information of the object. The display position information is information indicating in which area of the display area the object should be displayed. The display position information may be pre-stored in the electronic device, or may be determined according to an operation of the user. For example, in a case that the user performs a moving operation on the object by a hand gesture, the display processing method can determine a destination to be moved, i.e., the display position information described herein, according to the hand gesture of the user.

Then, at step S103, the display processing method displays the object in a first display mode when the display position information corresponds to the first area. On the other hand, the display processing method displays the object in a second display mode when the display position information corresponds to the second area.

Specific modes of the first display mode and the second display mode are not limited, only if the first display mode is different from the second display mode.

In particular, for example, in a first example, in the first display mode, the display processing method displays the object in the first area with a first display size. In the second display mode, the display processing method displays the object in the second area with a second display size, the first display size being larger than the second display size.

That is, in this example, for the same object, the display size in the non-edge area is larger than that in the edge area. Accordingly, according to the embodiment of the present disclosure, the object is displayed with a larger size when the object is displayed in a salient area of the display area (such as the non-edge area or even a center area), so as to be able to attract attention of the user. The object is displayed with a smaller size when the object is displayed in a non-salient area of the display area (such as the edge area), so as to be able to save display space and facilitate a display of other objects.

In a second example, in the first display mode, the display processing method displays a plurality of display elements of the object in the first area with a first display layout. In the second display mode, the display processing method displays at least a part of the plurality of display elements of the object in the second area with a second layout.

The display elements are display information of the elements comprised in the object. For example, in a case of the system menu, the display elements may be icons of respective options in the system menu (for example, respective navigate icons).

More particularly, in an implementation, under the first layout, the display processing method for example can arrange the plurality of display elements in a loose manner. Under the second layout, the display processing method for example can arrange the plurality of display elements in a compact manner.

In another implementation, under the first layout, the display processing method for example can arrange the plurality of display elements in a shape such as a circular shape and the like. Under the second layout, the display processing method for example can arrange at least a part of the plurality of the display elements in a shape such as a semicircular shape and the like.

Of course, the first layout, the second layout and the arrangement shape of the display elements are just for illustrating. Those skilled in the art can design other various layouts according to the requirements only if the first layout is different from the second layout.

Accordingly, according to the example of the present disclosure, the object is displayed for example in the loose layout or the circular layout when the object is displayed in the salient area (such as the non-edge area or even the center area) of the display area, so as to facilitate the operation of operation bodies (such as fingers) of the user. The object is displayed for example in the compact layout or the semicircular layout when the object is displayed in the non-salient area (such as the edge area) of the display area, so as to make the object completely displayed within a limited space as much as possible.

In a third example, in the first display mode, the display processing method displays the object in the first area in a first operation form. In the second display mode, the display processing method displays the object in the second area in a second operation form. The number of operable controls comprised in the first operation form is larger than the number of operable controls comprised in the second operation form.

More particularly, for example, in a case of the object being an application (such as a player), in the first operation form, the display processing method displays a plurality of operable controls (such as play/pause key, fast forward/fast backward key and so on) of the player in the first area; in the second operation form, the display processing method displays a part of all the operable controls of the player in the second area, for example, only displaying the play/pause key.

Accordingly, according to the example of the present disclosure, the object is displayed for example in a manner of a complete operation form when the object is displayed in the salient area (such as the non-edge area or even the center area) of the display area, so as to make the user be able to use all functions of the object. The object is displayed for example in a manner of a simplified operation form when the object is displayed in the non-salient area (such as the edge area) of the display area, so as to be able to save the display space under the premise of keeping key functions of the object.

In a fourth example, in the first display mode, the display processing method displays at least a first part of the object in the first area. In the second display mode, the display processing method displays at least a second part of the object in the second area. The first part is greater than the second part.

More particularly, for example, in a case of the object being a picture or a file, in the first display mode, the display processing method displays a full page of the picture or the file in the first area. In the second display mode, the display processing method displays a part of the picture or the file in the second area.

Accordingly, according to the example of the present disclosure, the object is displayed for example in a manner of a complete display form when the object is displayed in the salient area (such as the non-edge area or even the center area) of the display area, so as to make the user be able to browse the content of the object. The object is displayed for example in a manner of a partial display form when the object is displayed in the non-salient area (such as the edge area) of the display area, so as to be able to save the display space while prompting the user to browse the object.

In another example of the present disclosure, the display processing method can further subdivide the second area into a first subarea and a second subarea. For example, the first subarea can correspond to a corner area of the edge area, and the second subarea can correspond to a non-corner area of the edge area.

In this case, the display processing method can further judge whether the display position information corresponds to the first subarea when the display position information corresponds to the second area.

The display processing method displays the object in the second subarea in the second display mode when it is judged that the display position information corresponds to the first subarea.

In other words, in this example, the display processing method does not display the object in a specific area of the second area, i.e., the first subarea (such as the corner area), regardless of the display position information of the object.

Accordingly, according to the example of the present disclosure, it can be made that specific information (such as power supply information, specific prompt information and so on) displayed on the specific area of the second area is not covered by the object.

Of course, the specific area of the second area is just for illustrating. Those skilled in the art may set a specific area in the first area according to the requirements so as to not display the object.

The above is a description of the display processing method according to the embodiment of the present disclosure. The display processing method of the embodiment of the present disclosure acquires the display position information of the object and performs corresponding display modes according to the display position information of the object, so as to give different treatments to the object according to the different areas where the object is located, thus diversifying the display modes of the object and greatly improving the user's experience.

Below will be a description of a further extension of the display processing method of the embodiment of the present disclosure with reference to FIG. 2.

Based on the display processing method described with reference to FIG. 1, the object has been displayed in the display area of the electronic device.

At step S201, the display processing method acquires the user's operation information for the object. In particular, the object can for example comprise at least one operable control for the user's operation (for example clicking and so on) to enable corresponding functions. The operation information is information generated from the user's operation, for example, track information of a touch point and the like. The display processing method for example acquires the operation information through the touch unit.

Next, at step S202, the display processing method acquires display position information of the object. The operation at step S202 is similar to that at step S102, detailed omitted herein. Of course, in a case that the display position information has been known, step S202 may also be omitted.

Then, at step S203, the display processing method performs a first operation corresponding to the operation information in a first operation function set when the display position information corresponds to the first area. On the other hand, the display processing method performs a second operation corresponding to the operation information in a second operation function set when the display position information corresponds to the second area.

Specific operation functions and number comprised in the first operation function set and the second operation function set are not limited only if the first operation function set is different from the second operation function set.

In particular, in a first example, functions corresponding to the first operation function set have an intersection with functions corresponding to the second operation function set, but the first operation function and the second operation function set are different.

For example, the display processing method performs an operation corresponding to the operation information in a first function and second function when the display position information corresponds to the first area. The display processing method performs an operation corresponding to the operation information in a first function and third function when the display position information corresponds to the second area.

More particularly, for example, assuming that the object is a media player comprising an operable control, in a case that the display position information corresponds to the first area, the first operation function set corresponding to the operable control comprises: a first function, i.e., the function of pausing in response to the user's operation in a current playing state; a second function, i.e., the function of playing in response to the user's operation in a current pausing state; in a case that the display position information corresponds to the second area, the second operation function set corresponding to the operable control comprises: a first function, i.e., the function of pausing in response to the user's operation in a current playing state; a third function, i.e., the function of closing in response to the user's operation in a current pausing state.

Accordingly, according to the example of the present disclosure, for the same object, when the object is displayed in different areas of the display area, the corresponding operation functions are not all the same, thus being able to diversify the user's experience.

In a second example, the first operation function set corresponds to one or more functions, and all the functions can be enabled. The second operation function set comprises at least a part of one or more functions, and the at least part of the one or one functions are disabled.

More particularly, for example, assuming that the object is a picture browser comprising an operable control. When the operable control is in an enabled state, the display position of a picture on the display area may be fixed so as to realize the function of "pinning", or may be unfixed so as to facilitate the user to freely move the display position of the picture, in response to the user's operation.

In this case, the operable control is in the enabled state when the display position information corresponds to the first area. The display processing method can realize the function of fixing or unfixing the display position of the picture in response to the user's operation. The operable control is in a disabled state when the display position information corresponds to the second area. At this time, even if the information processing method determines based on the operation information that the user has performed an operation on the operable control, the corresponding functions are still not performed.

Accordingly, according to the example of the present disclosure, for the same object, when the object is displayed in different areas of the display area, the corresponding operation functions can be in different states (enabled/disabled), thus being able to diversify the user's experience.

In a third example, the functions corresponding to the first operation function set are more than the functions corresponding to the second operation function set.

More particularly, for example, assuming that the object is a menu comprising an operable control, for example an application icon. In a case that the display position information corresponds to the first area, the first operation function set comprises: a first function, i.e., changing the display position of the application icon in response to a sliding operation of the user; a second function, i.e., starting the application in response to a clicking operation of the user; in a case that the display position information corresponds to the second area, the second operation function set merely comprises the second function.

According to the example of the present disclosure, for the same object, when the object is displayed in different areas of the display area, the number of operations which may be performed on the object is different, thus diversifying the user's experience.

The above is a description of the further extension of the display processing method according to the embodiment of the present disclosure, wherein the operation information and the display position information of the object are acquired and the corresponding display modes are adopted according to the display position information, so as to give different treatments to the object according to the different areas where the object is located, thus diversifying the operation modes of the object and greatly improving the user's experience.

Below will be a description of a display processing apparatus of the embodiment of the present disclosure with reference to FIG. 3.

The display processing apparatus of the embodiment of the present disclosure is applicable to an electronic device. The electronic device has a display area being divided into a first area and a second area.

Figure 3:
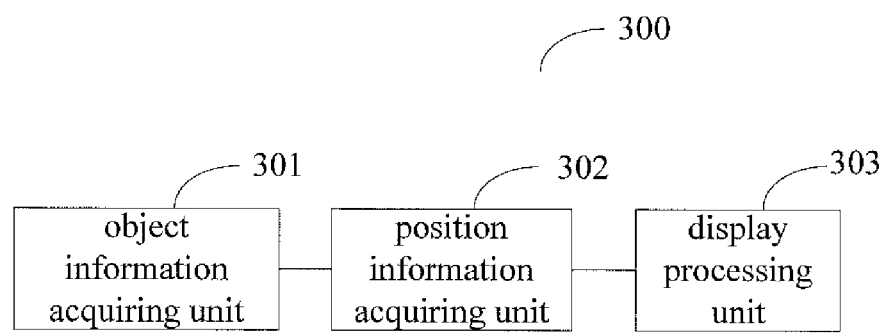
FIG. 3 is a block diagram illustrating major configurations of a display processing apparatus according to the embodiment of the present disclosure.

As shown in FIG. 3, the display processing apparatus 300 of the embodiment of the present disclosure comprises: an object information acquiring unit 301, a position information acquiring unit 302 and a display processing unit 303.

The object information acquiring unit 301 acquires object information of an object to be displayed.

The position information acquiring unit 302 acquires display position information of the object.

The display processing unit 303 displays the object in a first display mode when the display position information corresponds to the first area, and displays the object in a second display mode when the display position information corresponds to the second area, the first display mode being different from the second display mode.

In an example, the second area is subdivided into a first subarea and a second area, and the display processing unit 303 comprises a judging unit and a processing unit (not shown in the figure).

The judging unit determines whether the display position corresponds to the first subarea when it is judged that the display position information corresponds to the second area.

The processing unit displays the object on the second subarea in the second display mode when it is determined that the display position information corresponds to the first subarea.

Specific configurations and operations of respective units of the display processing apparatus 300 of the embodiment of the present disclosure have been described in detail in the display processing method with reference to FIG. 1, detailed omitted herein.

The above is a description of the display processing apparatus according to the embodiment of the present disclosure. The display processing apparatus acquires the display position information of the object and performs the corresponding display modes according to the display position information, so as to give different treatments to the object according to the different areas where the object is located, thus diversifying the operation modes of the object and greatly improving the user's experience.

Below will be a description of a further extension of the display processing apparatus of the embodiment of the present disclosure with reference to FIG. 4.

Figure 4:
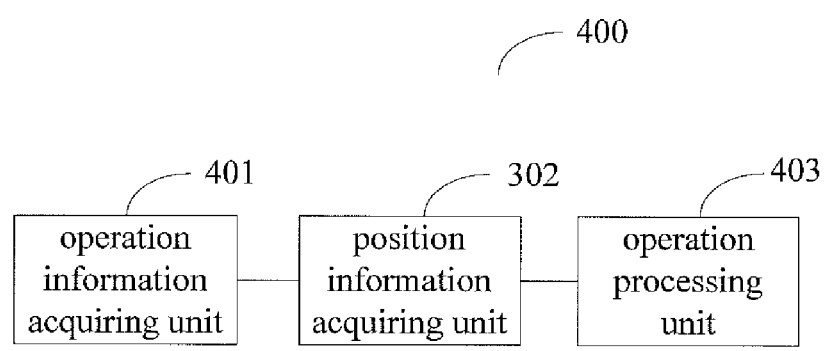
FIG. 4 is a block diagram illustrating extension configurations of the display processing apparatus according to the embodiment of the present disclosure.

As shown in FIG. 4, the display processing apparatus 400 of the embodiment of the present disclosure further comprises: an operation information acquiring unit 401 and an operation processing unit 403.

The operation information acquiring unit 401 acquires the users' operation information of an object.

The position information acquiring unit 402 acquires display position information of the object to be displayed.

The operation processing unit 403 performs a first function corresponding to the operation information in a first operation function set when the display position information corresponds to the first area, and performs a second function corresponding to the operation information in a second operation function set when the display position information corresponds to the second area, the first operation function set being different from the second operation function set.

Figure 2:
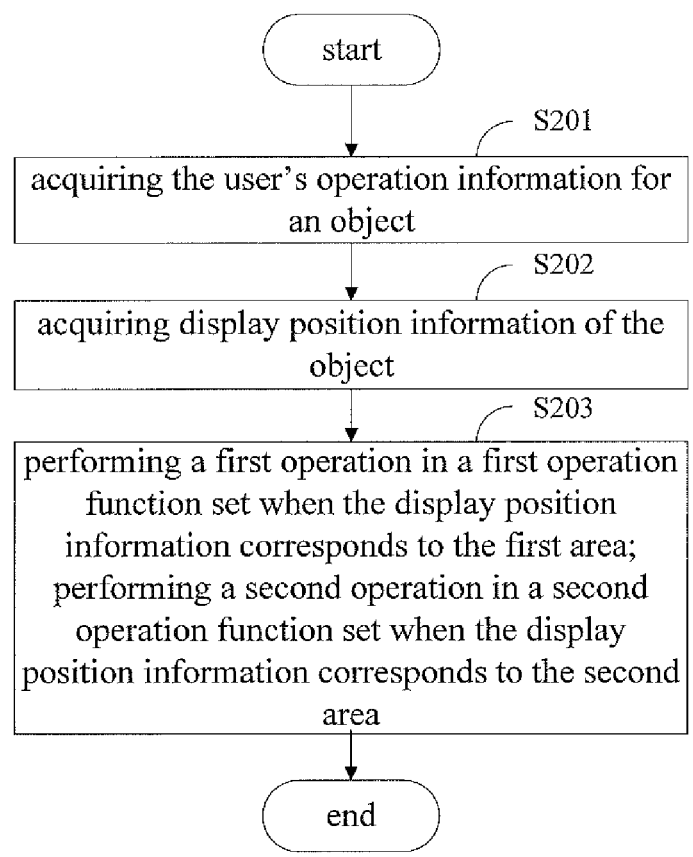
FIG. 2 is a flow chart illustrating an extension of the display processing method according to the embodiment of the present disclosure.

Specific configurations and operations of respective units of the display processing apparatus 400 of the embodiment of the present disclosure have been described in detail in the display processing method with reference to FIG. 2, detailed omitted herein.

The above is a description of the further extension of the display processing apparatus according to the embodiment of the present disclosure. The display processing apparatus of the embodiment of the present disclosure acquires the operation information and display position information of the object and adopts the corresponding operation modes according to the display position information, so as to give different treatments to the object according to the different areas where the object is located, thus diversifying the operation modes of the object and greatly improving the user's experience.

In the display processing method and apparatus of the first embodiment of the present disclosure described above with reference to FIGS. 1-4, it is focused in describing in the process of processing the object in different display modes or operation modes when the object are in different areas.

In the display processing method and apparatus of a second embodiment of the present disclosure described below with reference to FIGS. 5-8, it will be focused on describing a process of switching display modes or operation modes of the object when the object is moved from an area to another area in the display area.

First, a display processing method will be described with reference to FIG. 5.

The display processing method is also applicable to the electronic device described above. That is, the electronic device has a display area being divided into the first area and the second area described above.

Further, in the display processing method of the embodiment of the present disclosure, an object is displayed in the display area. The meaning of the object is the same as that of the object described with reference to FIGS. 1-4, details omitted herein.

Figure 5:
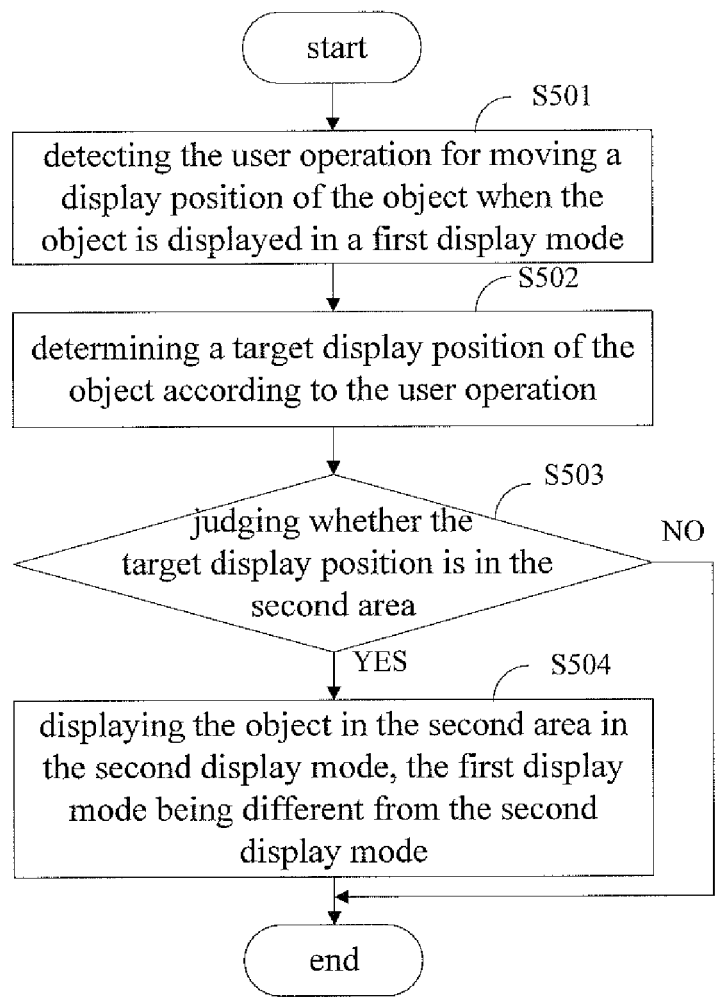
FIG. 5 is a flow chart illustrating a display processing method according to another embodiment of the present disclosure.

As shown in FIG. 5, firstly, at step S501, the display processing method detects a moving operation performed by the user to move a display position of the object when the object is displayed in a first display mode.

In particular, for example, the user moves the object through a specific hand gesture such as a hand gesture of dragging and the like. The display processing method can detect the moving operation of the user through a touch unit.

Next, at step S502, the display processing method determines a target display position of the object according to the moving operation.

For example, the display processing method determines an end point of a touch point track as the target display position of the object based on the touch point track of the moving operation detected by the touch unit.

For another example, the display processing method determines the target display position of the object based on a moving direction, speed and time of the moving operation.

Of course, the display processing method can further determine the target display position based on other known various manners in the art, details omitted herein.

After the target display position is determined, the display processing method judges whether the target display position is in the second area at step S503.

Next, the display processing method is ended when it is judged that the target display position is not in the second area. For example, the display processing method can maintain the first display mode unchanged when it is judged that the target display position is still in the first area.

On the other hand, the display processing method performs the operation step S504 when it is judged that the target display position is in the second area.

At step S504, the display processing method displays the object in the second display mode. The first display mode is different from the second display mode.

Specific modes of the first display mode and the second display mode are not limited only if the first display mode is different from the second display mode.

In addition, it is needed to point out that the above is a description by taking a process of moving from the first area to the second area as an example. Those skilled in the art can also apply the process into a process of moving from the second area to the first area.

In particular, for example, in a first example, in the first display mode, the display processing method displays the object in the first area with a first display size; in the second display mode, the display processing method displays the object in the second area with a second display size. The first display size is larger than the second display size.

That is, in this example, for the same object, the display size in the non-edge area is larger than that in the edge area. Accordingly, according to the example of the present disclosure, the display size of the object is reduced when the object is moved from a salient area (such as the non-edge area or even a center area) of the display area to a non-salient area (such as the edge area) of the display area, so as to save the display space and facilitate the display of other objects.

On the contrary, the display size of the object is increased when the object is moved from the non-salient area of the display area to the salient area of the display area, so as to attract attention of the user and facilitate the user's operation.

In a second example, in the first display mode, the display processing method displays a plurality of display elements of the object in the first area with a first layout; in the second display mode, the display processing method displays at least part of the plurality of display elements of the object in the second area with a second layout.

The display elements are display information of the elements comprised in the object. For example, in a case of the system menu, the display elements may be icons of respective options in the system menu.

More particularly, for example, under the first layout, the display processing method for example can arrange the plurality of display elements in a loose manner. Under the second layout, the display processing method for example can arrange the plurality of display elements in a compact manner.

For another example, under the first layout, the display processing method for example can arrange the plurality of display elements in a shape such as a circular and the like. Under the second layout, the display processing method for example can arrange the plurality of the display elements in a shape such as a semicircular and the like.

Of course, the first layout, the second layout and the arrangement shape of the display elements are just for illustrating. Those skilled in the art can design other various layouts according to the requirements only if the first layout is different from the second layout.

Accordingly, according to the example of the present disclosure, the object is displayed in a more compact manner when the object is moved from the salient area of the display area to the non-salient area of the display area, so as to make the object completely displayed within a limited space as much as possible.

On the contrary, the object is displayed in a more loose manner when the object is moved from the non-salient area of the display area to the salient area of the display area, so as to facilitate the operation of the operation bodies (such as fingers) of the user.

In a third example, in the first display mode, the display processing method displays the object in the first area in a first operation form. In the second display mode, the display processing method displays the object in the second area in a second operation form. Then number of operable controls comprised in the first operation form is larger than the number of operable controls comprised in the second operation form.

More particularly, for example, in a case of the object being an application (such as a player), in the first operation form, the display processing method displays a plurality of operable controls (such as play/pause key, fast forward/fast backward key and so on) of the player in the first area; in the second operation form, the display processing method displays a part of all the operable controls of the player in the second area, for example, only displaying play/pause key.

Accordingly, according to the example of the present disclosure, the object is displayed in a more simplified manner when the object is moved from the salient area of the display area to the non-salient area of the display area, so as to be able to save the display space under the premise of keeping key functions of the object.

On the contrary, the object is displayed in a more complete manner when the object is moved from the non-salient area of the display area to the salient area of the display area, so as to make the user be able to use all functions of the object.

In a fourth example, in the first display mode, the display processing method displays at least a first part of the object in the first area. In the second display mode, the display processing method displays at least a second part of the object in the second area. The first part is larger than the second part.

More particularly, for example, in a case of the object being a picture or a file, in the first display mode, the display processing method displays a full page of the picture or the file on the first area. In the second display mode, the display processing method displays a part of the picture or the file in the second area.

Accordingly, according to the example of the present disclosure, the display content of the object is reduced when the object is moved from the salient area of the display area to the non-salient area of the display area, so as to be able to save the display space while prompting the user to browse the object.

On the contrary, the display content of the object is increased when the object is moved from the non-salient area of the display area to the salient area of the display area, so as to make the user be able to browse the content of the object as complete as possible.

In other examples, the display processing method can subdivide the second area into a first subarea and a second subarea. For example, the first subarea can correspond to a corner area of the edge area. The second subarea can correspond to a non-corner area of the edge area.

In this case, the display processing method can further judge whether the display position information corresponds to the first subarea when the display position information corresponds to the second area.

The display processing method displays the object on the second subarea in the second display mode when it is judged that the display position information corresponds to the first subarea.

In other words, in this example, the display processing method does not display the object on a specific area of the second area, i.e., the first subarea (such as the corner area), regardless of the target display position of the object.

Accordingly, according to the example of the present disclosure, it can be made that specific information (such as power supply information, specific prompt information and so on) displayed on the specific area of the second area is not covered by the object.

Of course, the specific area of the second area is just for illustrating. Those skilled in the art may set a specific area in the first area according to the requirements so as to not display the object.

The above is a description of the display processing method according to the embodiment of the present disclosure. The display processing method of the embodiment of the present disclosure acquires the target display position of the object when the user's operation moving the object is detected and switches the display mode according to the target display position of the object, so as to give different treatments to the object according to the different areas where the object is located, thus diversifying the display modes of the object and greatly improving the user's experience.

Below will be a description of a further extension of the display processing method of the second embodiment of the present disclosure with reference to FIG. 6.

The display processing method of the embodiment of the present disclosure is also applicable to the electronic device described above. That is, the electronic device has a display area being divided into the first area and the second area.

Further, in the display processing method of the embodiment of the present disclosure, an object is displayed on the display area. The meaning of the object is the same as that of the object described with reference to FIGS. 1-4, details omitted herein.

Figure 6:
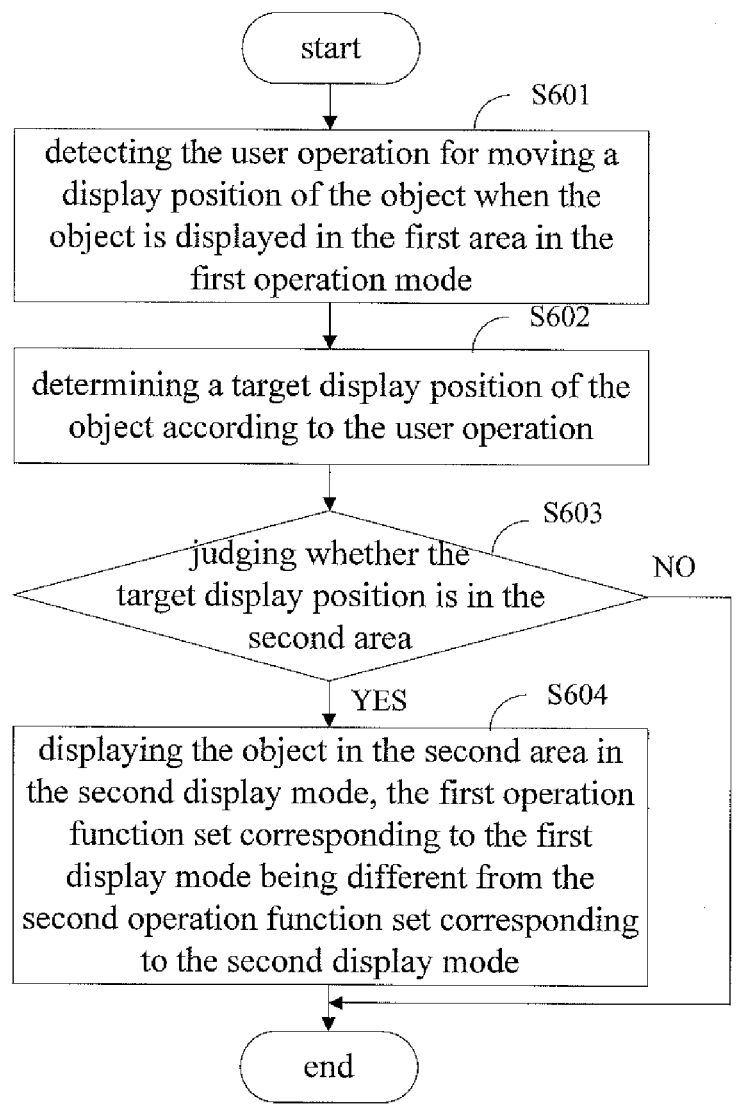
FIG. 6 is a flow chart illustrating an extension of the display processing method according to said another embodiment of the present disclosure.

As shown in FIG. 6, first, at step S601, the object is displayed in a first operation mode, and the display processing method detects a user operation for moving a display position of the object.

Next, at step S602, the display processing method determines a target display position of the object according to the user operation.

Then, at step S603, the display processing method judges whether the target display position is in the second area.

Operations at steps S601-S603 are similar to the operations at steps S501-S503 described above with reference to FIG. 5, details omitted herein.

Next, the display processing method is ended when the display processing method judges that the target display position is not in the second area. For example, the display processing method can maintain the first display mode unchanged when it is judged that the target display position is still in the first area.

On the other hand, the display processing method performs the operation at step S604 when it is judged that the target display position is in the second area.

At step S604, the display processing method display the object in the second display mode. The first operation function set corresponding to the first display mode is different from the second operation function set corresponding to the second display mode.

Specific operation functions and numbers comprised in the first operation function set and the second operation function set are not limited only if the first operation function set is different from the second operation function set.

In addition, it is needed to point out that the above is a description by taking a process of moving from the first area to the second area as an example. Those skilled in the art can also apply the process into a process of moving from the second area to the first area.

In particular, in a first example, functions corresponding to the first operation function set have an intersection with functions corresponding to the second operation function set, but the first operation function and the second operation function set are different.

For example, the display processing method performs an operation corresponding to the operation information in a first function and second function when the display position information corresponds to the first area. The display processing method performs an operation corresponding to the operation information in a first function and third function when the display position information corresponds to the second area.

More particularly, for example, assuming that the object is a media player comprising an operable control, in a case that the display position information corresponds to the first area, the first operation function set corresponding to the operable control comprises: a first function, i.e., the function of pausing in response to the user's operation in a current playing state; a second function, i.e., the function of playing in response to the user's operation in a current pausing state; in a case that the display position information corresponds to the second area, the second operation function set corresponding to the operable control comprises: a first function, i.e., the function of pausing in response to the user's operation in a current playing state; a third function, i.e., the function of closing in response to the user's operation in a current pausing state.

Accordingly, according to the example, when the object is moved from one area of the display area to another area of the display area, the object is made to have operation functions being not all the same, thus being able to diversify the user's experience.

In a second example, the first operation function set corresponds to one or more functions, and all the functions can be enabled. The second operation function set comprises at least a part of one or more functions, and the at least part of the one or one functions are disabled.

More particularly, for example, assuming that the object is a picture browser comprising an operable control. When the operable control is in an enabled state, the display position of a picture on the display area may be fixed so as to realize the function of "pinning", or may be unfixed so as to facilitate the user to freely move the display position of the picture, in response to the user's operation.

In this case, the operable control is in the enabled state when the display position information corresponds to the first area. The display processing method can realize the function of fixing or unfixing the display position of the picture in response to the user's operation. The operable control is in a disabled state when the display position information corresponds to the second area. At this time, even if the information processing method determines based on the operation information that the user has performed an operation on the operable control, the corresponding functions are still not performed.

Accordingly, according to the example, when the object is moved from one area of the display area to another area of the display area, the operation function of the object is made to be enabled or disabled, thus being able to diversify the user's experience.

In a third example, the functions corresponding to the first operation function set are more than the functions corresponding to the second operation function set.

More particularly, for example, assuming that the object is a menu comprising an operable control, for example an application icon. In a case that the display position information corresponds to the first area, the first operation function set comprises: a first function, i.e., changing the display position of the application icon in response to a sliding operation of the user; a second function, i.e., starting the application in response to a clicking operation of the user; in a case that the display position information corresponds to the second area, the second operation function set merely comprises the second function.

Accordingly, according to the example, when the object is moved from one area of the display area to another area of the display area, the number of operation functions of the object is made to be different, thus being able to diversify the user's experience.

The above is a description of the further extension of the display processing method according to the embodiment of the present disclosure. The display processing method according to the embodiment of the present disclosure acquires the target display position of the object when the user's operation moving the object is detected and switches the display mode according to the target display position of the object, so as to give different treatments to the object according to the different areas where the object is located, thus diversifying the display modes of the object and greatly improving the user's experience.

Below will be a description of a display processing apparatus of the second embodiment of the present disclosure with reference to FIG. 7.

The display processing apparatus of the embodiment of the present disclosure is also applicable to an electronic device. The electronic device has a display area being divided into a first area and a second area.

Figure 7:
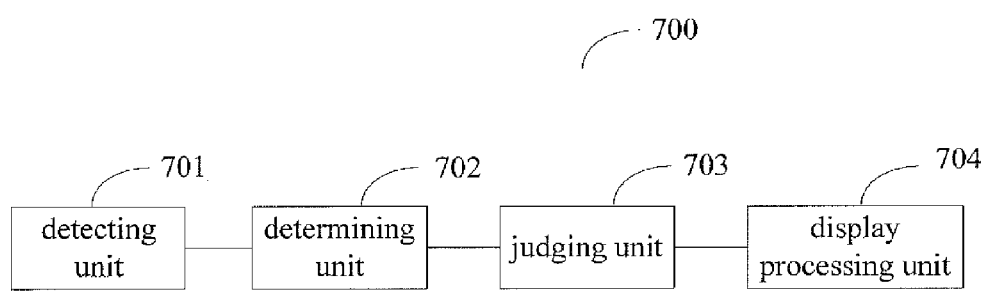
FIG. 7 is a block diagram illustrating major configurations of a display processing apparatus according to said another embodiment of the present disclosure.

As shown in FIG. 7, the display processing apparatus 700 of the embodiment of the present disclosure comprises: a detecting unit 701, a determining unit 702, a judging unit 703 and a display processing unit 704.

The detecting unit 701 detects a user operation for moving the display position of the object when the object is displayed in the first display mode.

The determining unit 702 determines the target display position of the object according to the user operation.

The judging unit 703 judges whether the target display position is in the second area.

The display processing unit 704 displays the object in a second display mode when it is judged that the target display position is in the second area, the first display mode being different from the second display mode.

It is needed to point out that the above is a description by taking a process of moving from the first area to the second area as an example. The display processing apparatus of the embodiment of the present disclosure can also be applied to a process of moving from the second area to the first area.

In an example, the second area is subdivided into a first subarea and a second subarea.

The judging unit further judges whether the target display position corresponds to the first subarea when it is judged that the target display position is in the second area.

The display processing unit displays the object on the second subarea in the second display mode when it is judged that the target display position corresponds to the first subarea.

Specific configurations and operations of respective units of the display processing apparatus 700 of the embodiment of the present disclosure have been described in detail in the display processing method with reference to FIG. 5, detailed omitted herein.

The above is a description of the display processing apparatus according to the embodiment of the present disclosure. The display processing apparatus of the embodiment of the present disclosure acquires the target display position of the object when the user's operation moving the object is detected and switches the display mode according to the target display position of the object, so as to give different treatments to the object according to the different areas where the object is located, thus diversifying the display modes of the object and greatly improving the user's experience.

Below will be a description of a further extension of the display processing apparatus of the second embodiment of the present disclosure with reference to FIG. 8.

Figure 8:
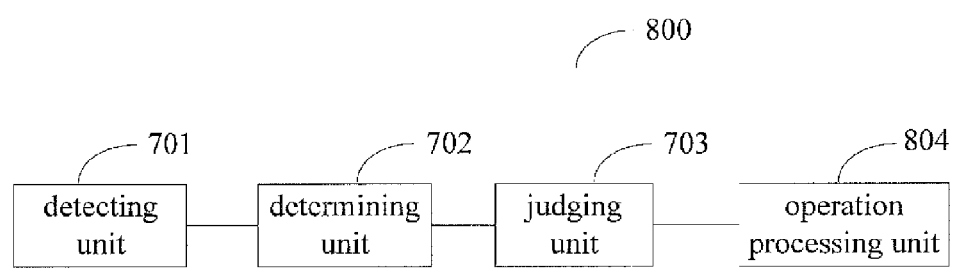
FIG. 8 is a block diagram illustrating extension configurations of the display processing apparatus according to said another embodiment of the present disclosure.

As shown in FIG. 8, the display processing apparatus 800 of the embodiment of the present disclosure further comprises: an operation processing unit 804.

The detecting unit 701 detects a user operation for moving the display position of the object when the object is displayed in the first display mode.

The determining unit 702 determines the target display position of the object according to the user operation.

The judging unit 703 judges whether the target display position is in the second area.

The operation processing unit 804 displays the object in the second display mode when it is judged that the target display position is in the second area, the first operation function set corresponding to the first display mode being different from the second operation function set corresponding to the second display mode.

It is needed to point out that the above is a description by taking a process of moving from the first area to the second area as an example. The display processing device of the embodiment of the present disclosure can also be applied to a process of moving from the second area to the first area.

Specific configurations and operations of respective units of the display processing apparatus 800 of the embodiment of the present disclosure have been described in detail in the display processing method with reference to FIG. 6, detailed omitted herein.

The above is a description of the display processing apparatus according to the embodiment of the present disclosure. The display processing apparatus of the embodiment of the present disclosure acquires the target display position of the object when the user's operation moving the object is detected and switches the operation mode according to the target display position of the object, so as to give different treatments to the object according to the different areas where the object is located, thus diversifying the display modes of the object and greatly improving the user's experience.

Below will be a description of schematic diagrams illustrating displays on an electronic device applying the display processing method of the embodiments of the present disclosure with reference to FIGS. 9-13, so as to better understand the present disclosure.

Figure 9A:
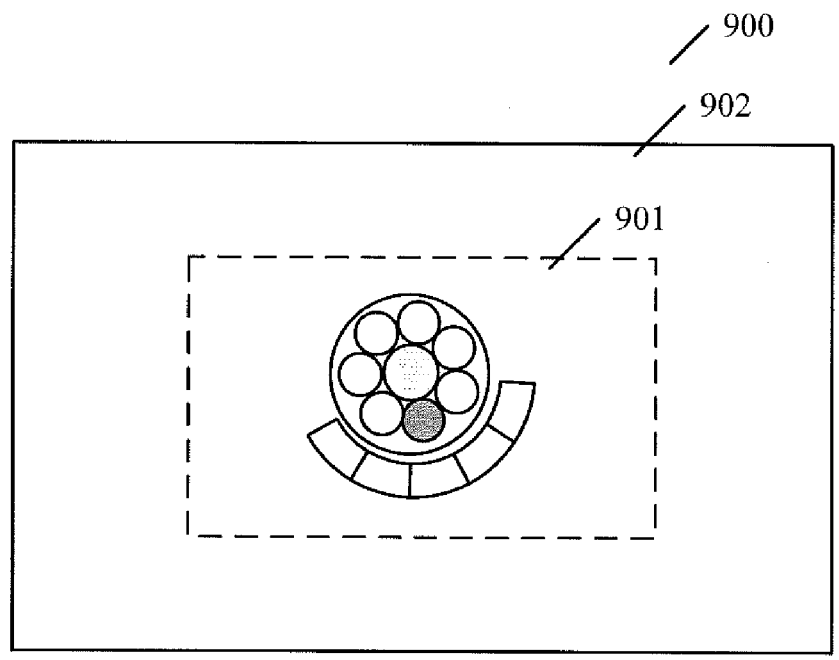
FIG. 9A is a schematic diagram illustrating a display on an electronic device applying the display processing method of the embodiments of the present disclosure the object is displayed in the first area with a first display size.
Figure 9B:
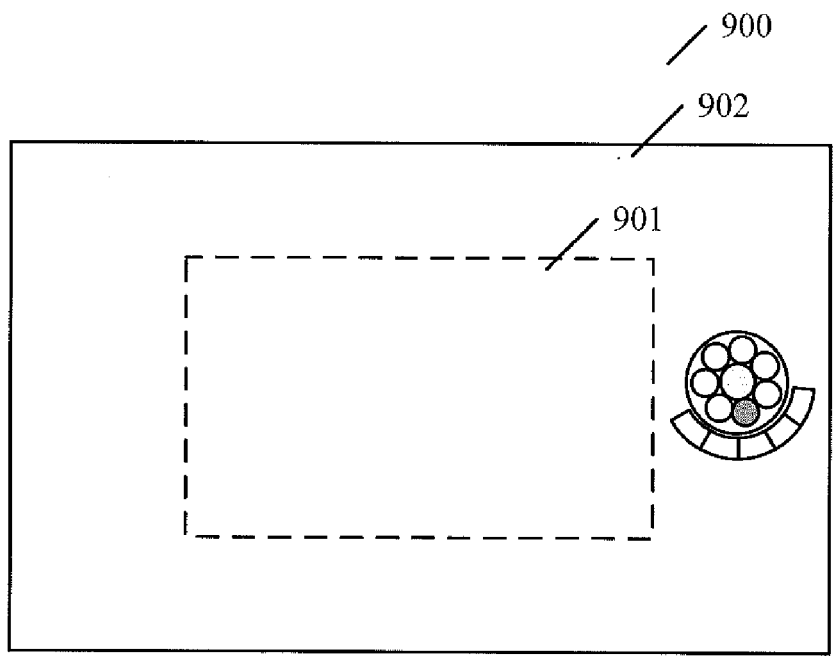
FIG. 9B is a schematic diagram illustrating a display on an electronic device applying the display processing method of the embodiments of the present disclosure where the object is displayed in the second area with a second display size.

FIGS. 9A and 9B are schematic diagrams illustrating a display on an electronic device applying the display processing method of the embodiments of the present disclosure.

As shown in FIGS. 9A and 9B, a display area 900 of the electronic device of the embodiments of the present disclosure is divided into a first area 901 and a second area 902. As an example, the first area 901 is a non-edge area of the display area 900 while the second area 902 is an edge area of the display area 900. A menu interface is displayed in the display area 900 as the object.

In FIG. 9A, the object is displayed in the first area with a first display size. In FIG. 9B, the object is displayed in the second area with a second display size. It can be seen from a comparison of FIGS. 9A and 9B that for the same object, the display size in the non-edge area is larger than that in the edge area.

Accordingly, according to the example, the object is displayed with a larger size when it is displayed in a salient area of the display area, so as to be able to attract attention of the user. The object is displayed with a smaller size when it is displayed in a non-salient area of the display area, so as to be able to save a display space and facilitate a display of other objects.

Figure 10A:
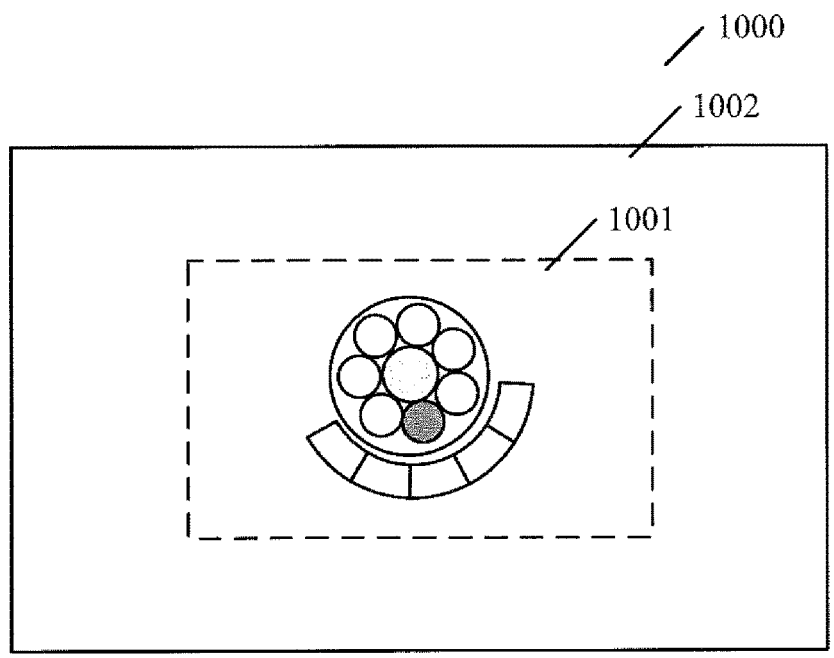
FIG. 10A is a schematic diagram illustrating another display on an electronic device applying the display processing method of the embodiments of the present disclosure.
Figure 10B:
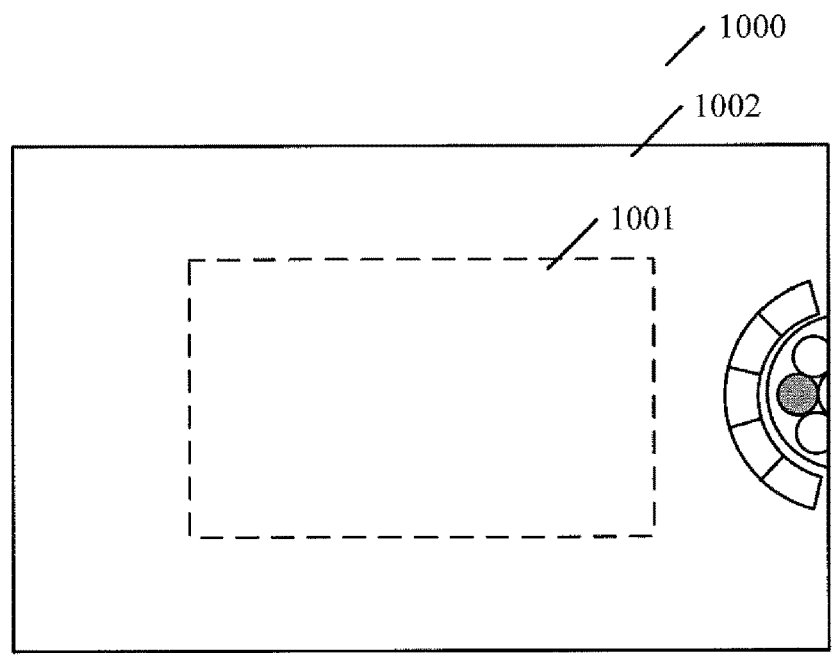
FIG. 10B is a schematic diagram illustrating a part of the display of FIG. 10A on an electronic device applying the display processing method of the embodiments of the present disclosure.

FIGS. 10A and 10B are schematic diagrams illustrating another display on an electronic device applying the display processing method of the embodiments of the present disclosure.

As shown in FIGS. 10A and 10B, also, a display area 1000 of the electronic device of the embodiment of the present disclosure is divided into a first area 1001 and a second area 1002. As an example, the first area 1001 is a non-edge area of the display area 1000 while the second area 1002 is an edge area of the display area 1000. A menu interface is displayed in the display area 1000 as the object.

In FIG. 10A, a plurality of display elements at the inner layer of the menu interface (for example, a plurality of menu options) are arranged in a shape such as a circular and the like. A plurality of display elements at the outer layer of the menu interface (for example, a plurality of sub menu options) are arranged in a shape such as a circular in a first direction. In FIG. 10B, at least part of the plurality of display elements at the inner layer of the menu interface (for example, a plurality of menu options) are arranged in a shape such as a semicircular and the like. At least part of the plurality of display elements at the outer layer of the menu interface (for example, a plurality of sub menu options) are arranged in a shape such as a circular in a second direction. It can be seen from a comparison of FIGS. 10A and 10B that, for the same object, the layout when the object is displayed in the non-edge area is different from the layout when the object is displayed in the edge area.

Accordingly, according to the example, the object is displayed for example in the loose layout or the circular layout when the object is displayed in the salient area of the display area, so as to facilitate the operation of operation bodies (such as fingers) of the user. The object is displayed for example in the compact layout or the semicircular layout when the object is displayed in the non-salient area of the display area, so as to make the object completely displayed within a limited space as much as possible.

Figure 11A:
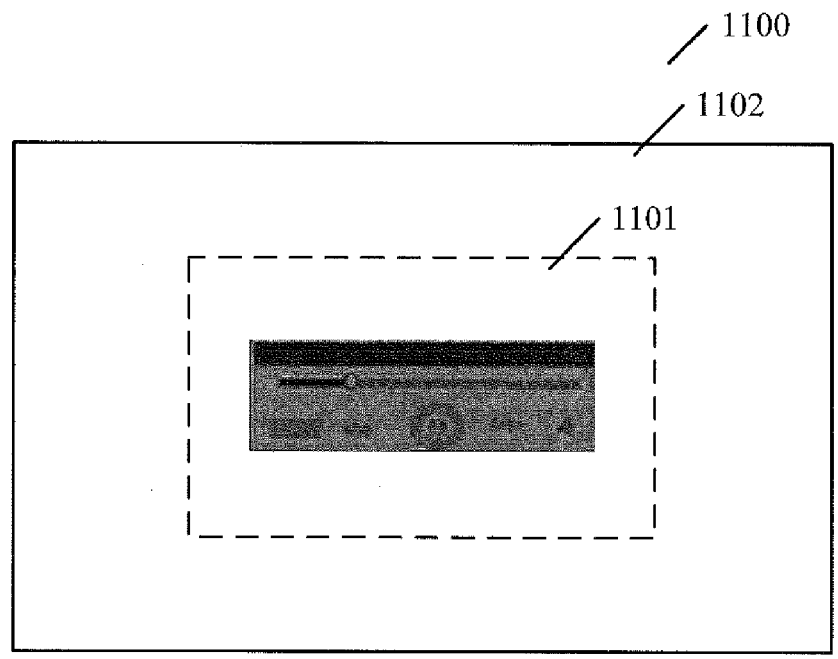
FIG. 11A is a schematic diagram illustrating another display on an electronic device applying the display processing method of the embodiments of the present disclosure.
Figure 11B:
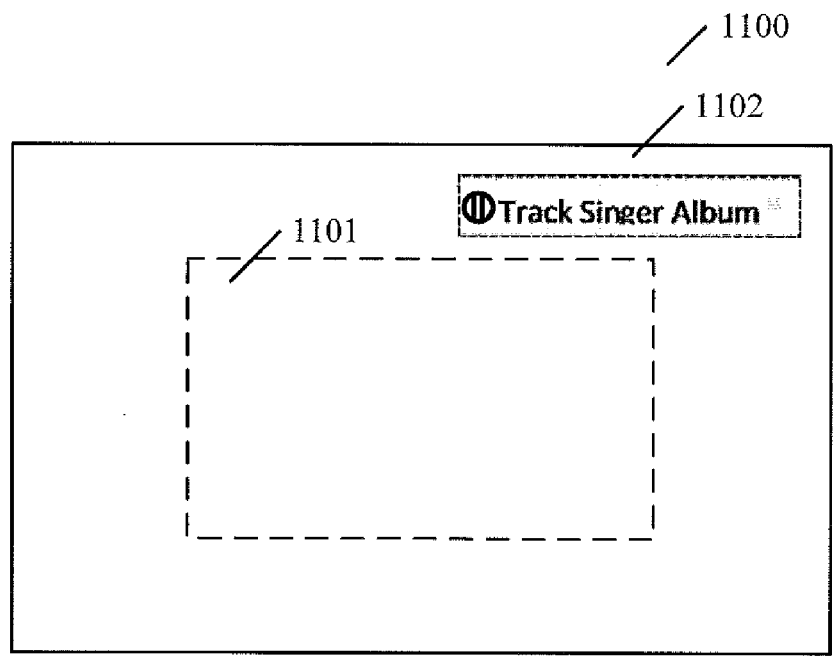
FIG. 11B is a schematic diagram illustrating the display of FIG. 11A on an electronic device applying the display processing method of the embodiments of the present disclosure.

FIGS. 11A and 11B are schematic diagrams illustrating another display on an electronic device applying the display processing method of the embodiments of the present disclosure.

As shown in FIGS. 11A and 11B, also, a display area 1100 of the electronic device of the embodiments of the present disclosure is divided into a first area 1101 and a second area 1102. As an example, the first area 1101 is a non-edge area of the display area 1100 while the second area 1102 is an edge area of the display area 1000. A player interface is displayed in the display area 1100 as the object.

In FIG. 11A, the player comprises a plurality of operable controls such as "play/pause", "fast forward", "fast backward" and so on. In FIG. 11B, the player only comprises one operable control, i.e., "play/pause". It can be seen from a comparison of FIGS. 11A and 11B that for the same object, the number of the operable controls when the object is displayed in the non-edge area is greater than the number of the operable controls when the object is displayed in the edge area.

Accordingly, according to the example, the object is displayed for example in a manner of a complete operation form when the object is displayed in the salient area of the display area, so as to make the user be able to use all functions of the object. The object is displayed for example in a manner of a simplified operation form when the object is displayed in the non-salient area of the display area, so as to be able to save the display space under the premise of keeping key functions of the object.

Figure 12A:
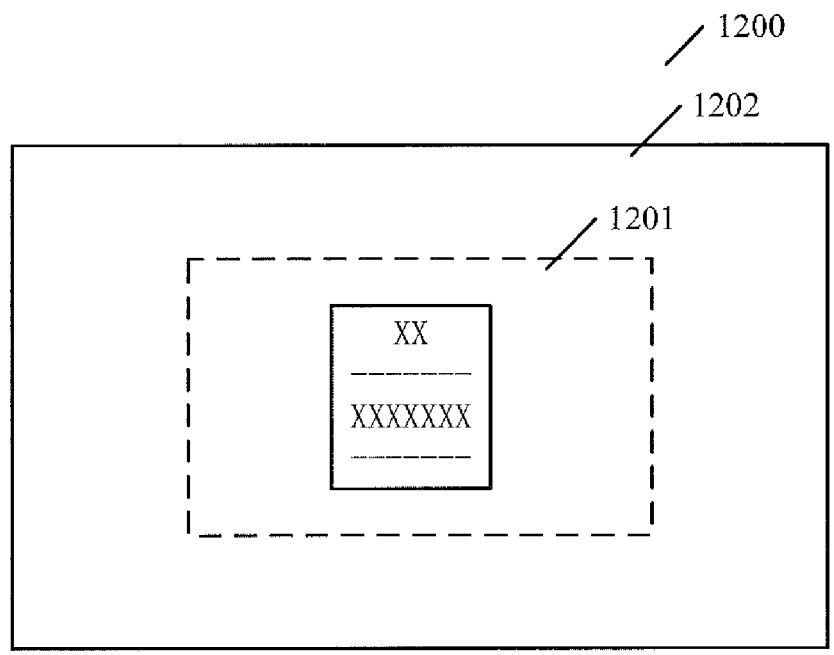
FIG. 12A is a schematic diagram illustrating another display on an electronic device applying the display processing method of the embodiments of the present disclosure.
Figure 12B:
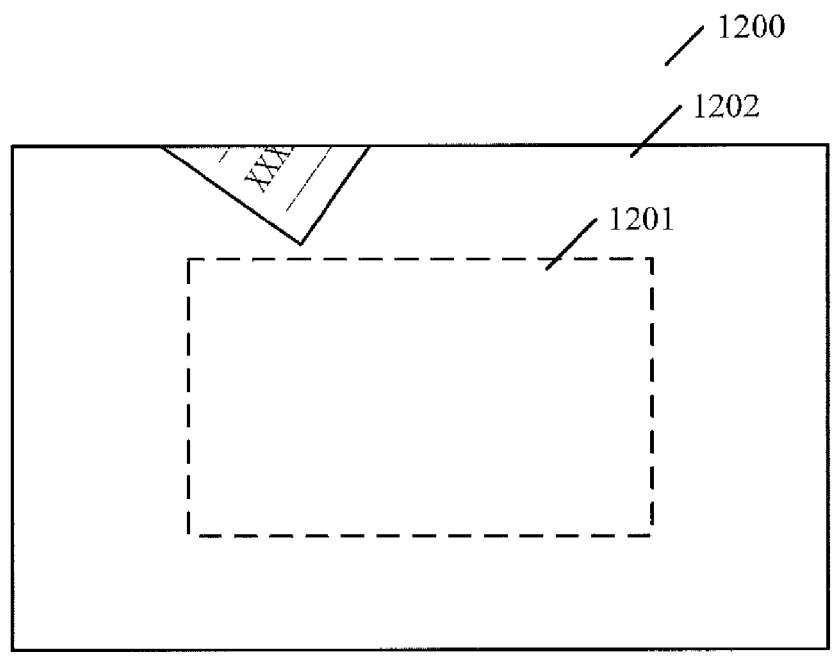
FIG. 12B is a schematic diagram illustrating the display of FIG. 12A on an electronic device applying the display processing method of the embodiments of the present disclosure.

FIGS. 12A and 12B are schematic diagrams illustrating another display on an electronic device applying the display processing method of the embodiments of the present disclosure.

As shown in FIGS. 12A and 12B, also, a display area 1200 of the electronic device of the embodiments of the present disclosure is divided into a first area 1201 and a second area 1202. As an example, the first area 1201 is a non-edge area of the display area 1200 while the second area 1202 is an edge area of the display area 1000. A file interface is displayed in the display area 1200 as the object.

In FIG. 12A, the file is displayed in the first area in a full page form. In FIG. 12B, the file is displayed in the second area in a partial page form. It can be seen from a comparison of FIGS. 12A and 12B that for the same object, the display content when the object is displayed in the non-edge area is more than the display content when the object is displayed in the edge area.

Accordingly, according to the example of the present disclosure, the object is displayed for example in a manner of a complete display form when the object is displayed in the salient area of the display area, so as to make the user able to completely browse the content of the object. The object is displayed for example in a manner of a partial display form when the object is displayed in the non-salient area of the display area, so as to be able to save the display space while prompting the user to browse the object.

Figure 13A:
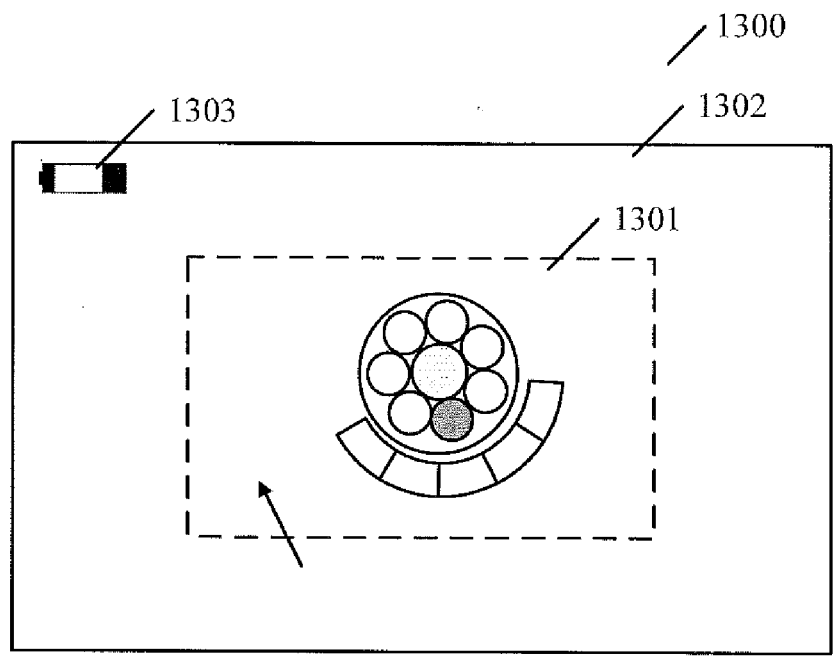
FIG. 13A is a schematic diagram illustrating another display on an electronic device applying the display processing method of the embodiments of the present disclosure.
Figure 13B:
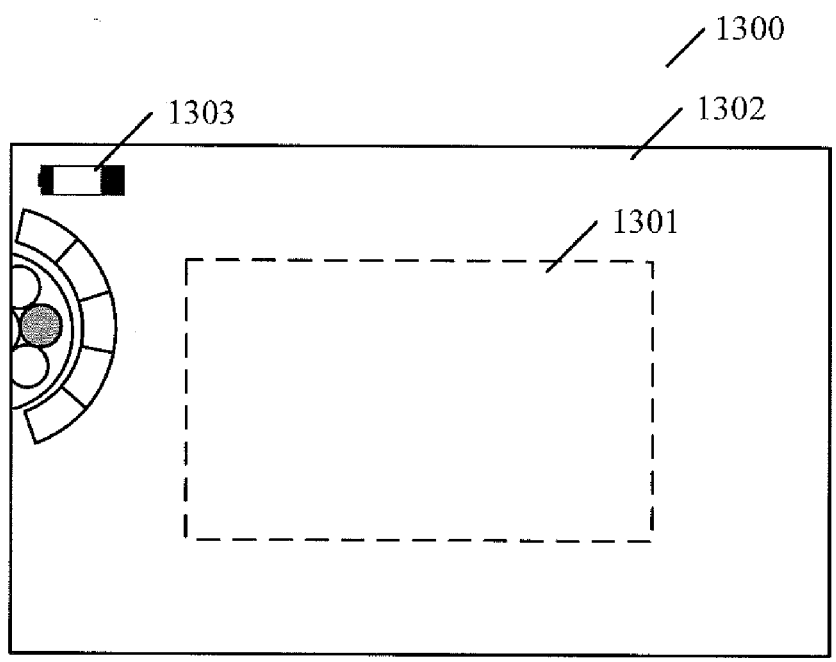
FIG. 13B is a schematic diagram illustrating the display of FIG. 13A on an electronic device applying the display processing method of the embodiments of the present disclosure.

FIGS. 13A and 13B are schematic diagrams illustrating another display on an electronic device applying the display processing method of the embodiments of the present disclosure.

As shown in FIGS. 13A and 13B, also, a display area 1300 of the electronic device of the embodiments of the present disclosure is divided into a first area 1301 and a second area 1302. As an example, the first area 1301 is a non-edge area of the display area 1300 while the second area 1302 is an edge area of the display area 1300. A menu interface similar to that as shown in FIG. 10A is displayed in the display area 1300 as the object.

Unlike FIG. 10A, in FIG. 13A, the second area 1302 of the display area 1300 is subdivided into a first subarea 1303 and a second subarea (the area apart from the first subarea 1303). An image indicating a battery level for example is displayed in the first subarea 1303.

At this time, if the electronic device detects for example a hand gesture operation for moving the menu as shown in the arrow direction in FIG. 10A and judges that the target display position is in the first subarea 1303, the electronic device displays the object in the second subarea (instead of in the first subarea 1303).

In other words, the object is not displayed in the specific area 1303 of the second area 1302, regardless of the target display position of the object.

Accordingly, according to the example, it can be made that specific information (such as power supply information, specific prompt information and so on) displayed on the specific area of the second area is not covered by the object.

Below will be a further description of the display processing method and apparatus of the embodiment of the present disclosure with reference to a specific example.

First, the display processing method is described according to the embodiments of the present disclosure with reference to FIGS. 14-19. As described above, the display processing method of the embodiments of the present disclosure is applicable to an electronic device such as a panel computer, a smart phone, a notebook computer and the like. That is, the electronic device has a display area being divided into a first area and a second area. An object is to be displayed on the display area.

For example, a first operation window (such as a navigate window) is displayed in the display area, wherein M first operation objects are arranged. An $i^{th}$ first operation object of the M first operation objects corresponds to a second operation window, and there are N second operation objects arranged on the second operation window, wherein M is an integer equal to or greater than 1, N is an integer equal to or greater than 1, and i is an random integer from 1 to M. The object is the second operation window, and the first operation window provides the display position information of the object.

Figure 14A:
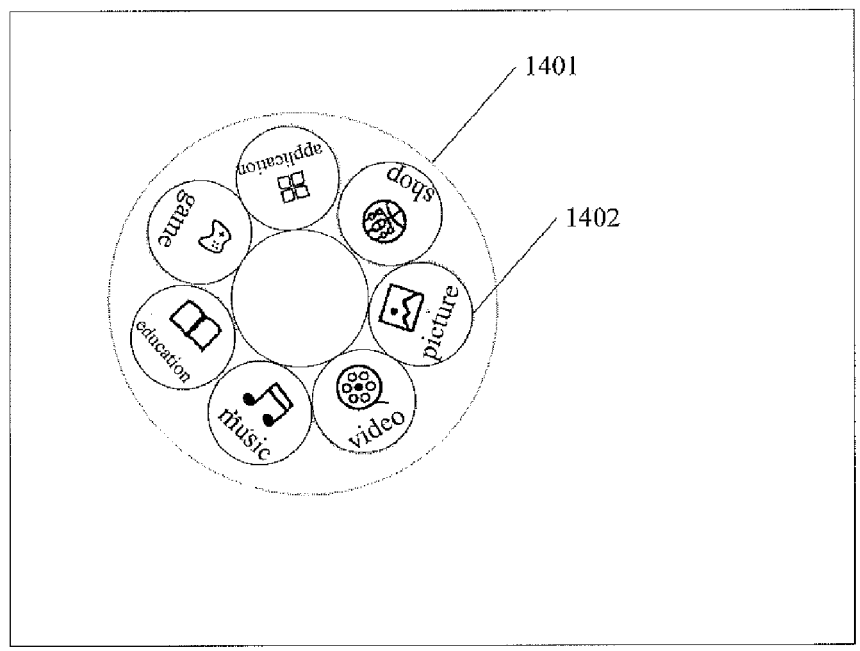
FIG. 14A is a schematic diagram illustrating a first operation window in the embodiments of the present disclosure.

Referring to FIG. 14A, for example, after the electronic device is powered on, a first operation window 1401 is displayed on the display area, or is displayed on the display area through a trigging operation; or the first operation window 1401 is displayed when there is an external electronic device connected to the electronic device, to which the present disclosure is not limited.

As shown in FIG. 14A, assuming that there are seven first operation objects arranged on the first operation window 1401. This example takes the first operation window being a circular as an example. In other examples, the first operation window may also be an ellipse, a rectangle or other shapes; the first operation object is specified by taking "picture", "application store", "application", "game", "education", "music" and "video" as examples. In these first operation objects, there may be folders such as "picture", "music", and there may also be a navigate menu option such as "application". Of course, the first operation object corresponding to the application may also be taken as a folder, and the folder may also be taken as a navigate menu option.

Next, for example, if the user wants to browse a picture, the user can utilize fingers or a touch pen or a mouse to select the first operation object corresponding to the "picture", that is, the first operation object 1402, i.e., the $i^{th}$ first operation object. At this time, the electronic device will select the first operation object 1402, in particular, for example indicating that the first operation object is selected by means of highlighting or sinking, and then the user will know that the first operation object has been selected.

Next, the second operation window is determined based on the display position and display direction of the first operation object 1402 on the display area. As for obtaining of the display position of the first operation object 1402, a coordinate value of the center of the first operation object 1402 can be obtained directly; as for obtaining of the display direction of the first operation object 1402, the center of the first operation window 1401 can be obtained, that is, the direction that the center of a circle points to the center of the first operation object 1402 is the display direction of the first operation object 1402, then the second operation window is determined based on the display position and the display direction. In an implementation, in particular, the position of the central point of the second operation window can be determined according to the display position and the display direction, the central point being for example on an extension line of the center from the center of the circle to the center of the first operation object 1402. In addition, it can be set that the second operation window is displayed for example close to the first operation window 1401, then the specific position of the center of the second operation window can be determined by a preset width of the second operation window, and thus the second operation window can be determined. That is, for the determination of the width of the second operation window, the second operation window can be determined based on the display position and the display direction of the first operation object 1402, regardless of the position of the display area where the first operation window 1401 moves, or the first operation window 1401 being rotated, or the direction to which the first operation object 1402 directs.

Figure 14B:
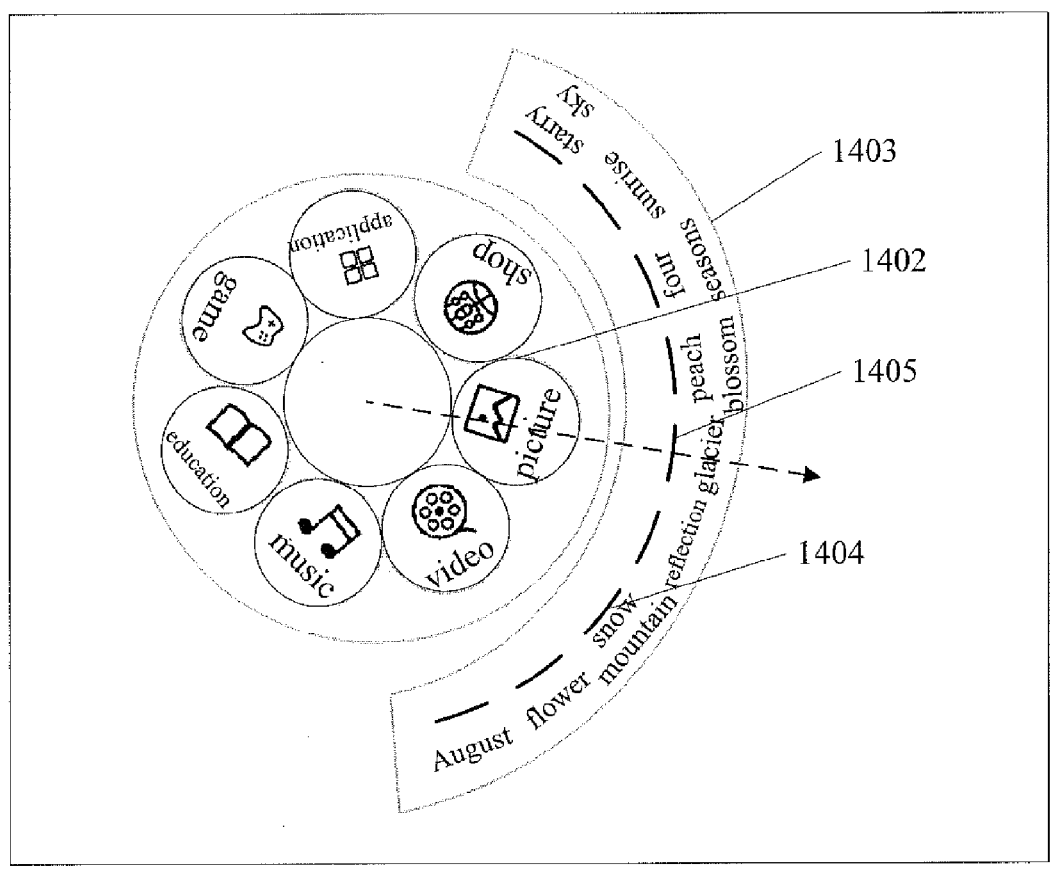
FIG. 14B is a schematic diagram illustrating a first operation window and a second operation window in the embodiments of the present disclosure.

Then, the second operation window is displayed on the display area, please referring to FIG. 14B for details. There are 9 second operation objects 1404 arranged on the second operation window 1403, which are a sub folder of the first operation object 1402 (for example a "picture" folder). As seen from FIG. 14B, the second operation window 1403 likes a fan, wherein the dotted line with an arrow is the display direction of the first operation object 1402, the center of the second operation window is on this dotted line, and the second operation window 1403 is symmetrical with this dotted line as an axis of symmetry; the display direction of the $q^{th}$ second operation object of the second operation object 1404 is consistent with the display direction of the first operation object 1402. In this example, the $q^{th}$ second operation object is the second operation object 1405, i.e., the folder named as glacier, the center of the second operation object 1405 is also the center of the second operation window 1403, and the center of the first operation object 1402 and that of the second operation object 1405 are aligned.

In an example, the position where the $q^{th}$ second operation object is located is the center of the second operation window, and other second operation objects are symmetrically distributed in both sides by centering the $q^{th}$ second operation object; of course, in other examples, the $q^{th}$ second operation object may also be located at a starting position or ending position of the second operation window.

Figure 15:
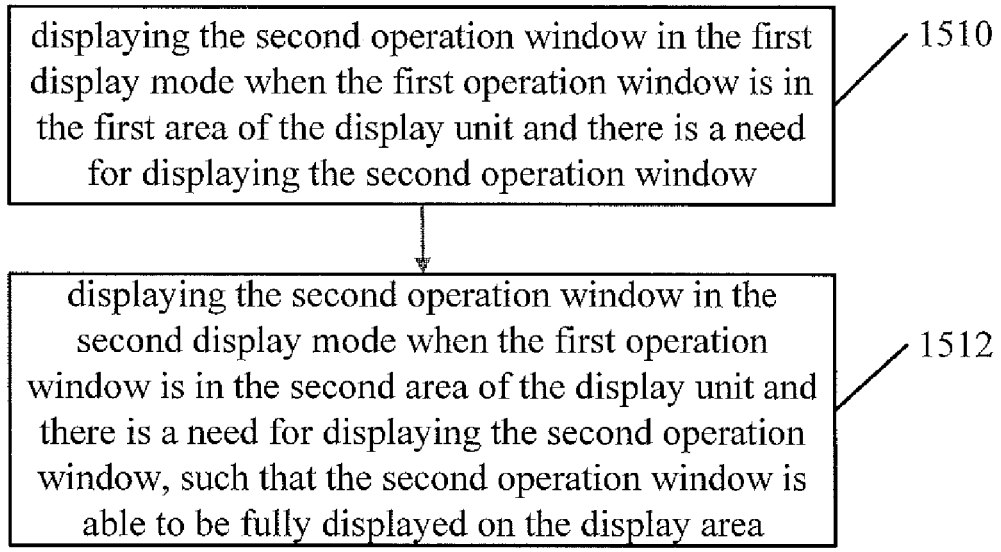
FIG. 15 is a flow chart of an embodiment where the display processing method of the embodiments of the present disclosure is applied to the electronic device.

FIG. 15 is a flow chart illustrating a case that the display processing method according to the embodiments of the present disclosure is applied to the navigate menu shown in FIG. 14. The method comprises the following steps:

Step 1510: displaying the second operation window in the first display mode when the first operation window is in the first area of the display unit and there is a need for displaying the second operation window;

Step 1512: displaying the second operation window in the second display mode when the first operation window is moved from the first area of the display area to the second area of the display area and there is a need for displaying the second operation window, such that the second operation window is able to be fully displayed in the display area.

Wherein the first area and the second area are not overlapped, and the second display mode and the first display mode are different.

Wherein, in this example, displaying the second operation window 1403 in the first display mode in particular comprises: determining the second operation window based on the display position and display direction of the $i^{th}$ first operation object on the display area; displaying the second operation window 1403, the display direction of the $q^{th}$ second operation object of the N second operation objects being consistent with the display direction of the $i^{th}$ first operation object, wherein q is an integer equal to or greater than 1 and equal to or less than N.

Wherein when the first operation window 1401 is at a first position of the first area, the display position of the $i^{th}$ first operation object is a first display position, and the display direction of the $i^{th}$ first operation object is a first display direction; when the first operation window 1401 is at a second position of the first area, the display position of the $i^{th}$ first operation object is a second display position, and the display direction of the $i^{th}$ first operation object is a second display direction, the first display direction being different from the second display direction.

Figure 16A:
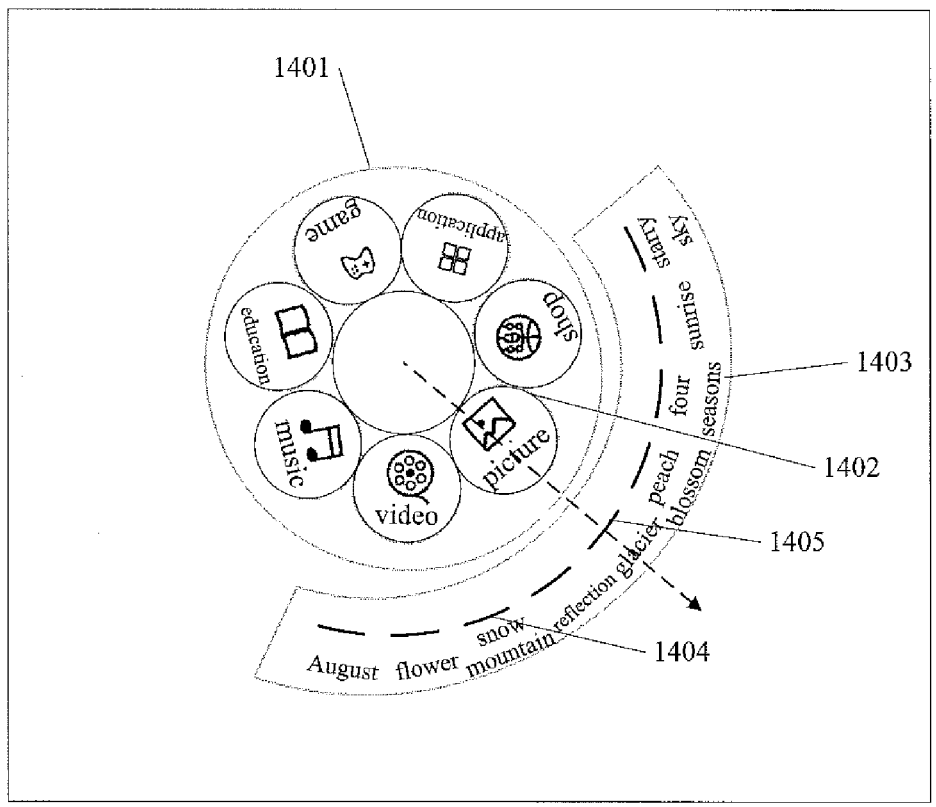
FIG. 16A is a schematic diagram illustrating various changing states for the first operation window and the second operation window in the embodiments of the present disclosure.

In particular, as shown in FIG. 16A, when the first operation window 1401 is moved from the first position of the display area for example the position in FIG. 14B to the second position in FIG. 16A, for example, being rotated from the first position to the second position, the first operation window 1401 is rotated 30 degrees clockwise and the position is moved at a certain distance from the left to the right in FIG. 14B. In this example, the display position and the display direction of the first operation object 1402 change, the display direction is also rotated 30 degrees clockwise, and the coordinate value is also changed, and therefore the display position and display direction of the second operation window 1403 on the display area may be changed due to the change of the display position and display direction of the first operation window 1402. As seen from FIG. 16A, the second operation window 1403 is also rotated 30 degrees clockwise, while the display direction of the second operation object 1405 is still in consistent with the display direction of the first operation object 1402.

The specific process of displaying the second operation window 1403 in the first display mode is similar to FIGS. 14A and 14B and their corresponding descriptions, details omitted herein.

Further, in this example, the first area refers to the area in which the second operation windows corresponding to all the first operation objects will not be hidden when the second operation windows corresponding to all the first operation objects of the M first operation objects are displayed in the first display mode; the second area refers to the area in which the second operation windows corresponding to at least one of the first operation objects will be hidden when the second operation windows corresponding to all the first operation objects of the M first operation objects are displayed in the first display mode.

Judging whether the first operation window 1401 is in the first area or in the second area in particular may depend on judging whether the second operation window is hidden or not.

Figure 16B:
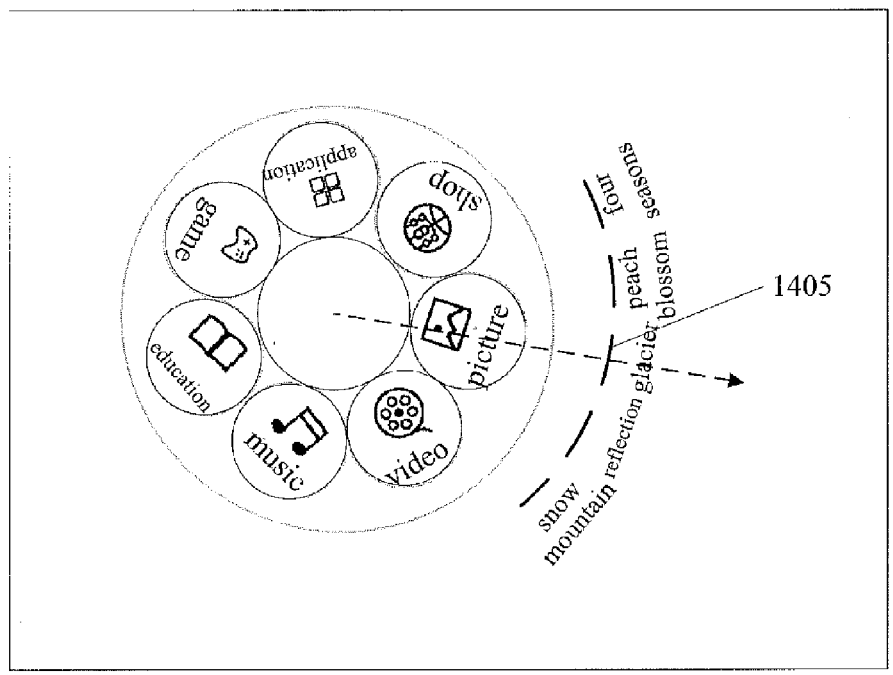
FIG. 16B is a schematic diagram illustrating various changing states for the first operation window and the second operation window in the embodiments of the present disclosure.
Figure 16C:
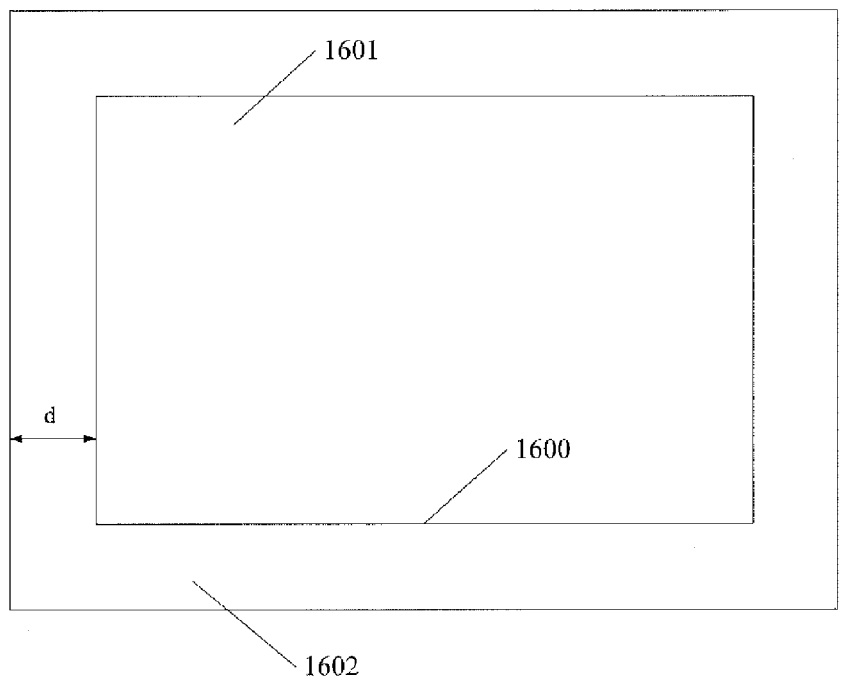
FIG. 16C is a schematic diagram illustrating various changing states for the first operation window and the second operation window in the embodiments of the present disclosure.

In another example, as shown in FIG. 16C, the display area is for example the display area without the structure of frames. The dotted line in FIG. 16C represents a boundary 1600 between the first area 1601 and the second area 1602, the first area 1601 is for example the center area, and the second area 1602 is the edge area. The value of the distance d between the boundary 1600 and the edge of the display area is related with the widths of the first operation window 1601 and the second operation 1603. Assuming that the width from the center of the first operation window 1401 to the periphery of the first operation window 1401 is D1, the first operation window 1401 and the second operation window 1403 are adjoined, and the width of the second operation window 1401 is for example D2, then the distance from the center of the first operation window 1401 to the periphery of the second operation window 1403 is D1+D2, hereinafter referred to as D3, then, the value of d is D2, for example, 120px.

Based on this example, judging whether the first operation window 1401 is in the first area 1601 or the second area 1602 can be performed based on the following rules in particular.

First, it is determined that the first operation window 1401 is in the first area 1601 when the first operation window 1401 is fully in the first area 1601.

Second, it is determined that the first operation window 1401 is in the second area 1602 when a part of the first operation window 1401 is in the first area 1601 and a part of the first operation window 1401 is in the second area 1602.

Third, it is determined that the first operation window 1401 is in the second area 102 when no part of the first operation window 1401 is in the first area 1601.

In the specific implementation process, before the step 1512, the method further comprises: moving the first operation window 1401 from the first area to the second area based on a moving instruction.

In particular, referring to FIG. 16C at the same time, when the user presses on the first operation window 1401 and drags it to the edge of the display area, a moving instruction is generated based on the operation of dragging. Then, the first operation window 1401 will be moved to the edge based on the moving instruction. It is determined that the first operation window 1401 is moved to the second area 1602 when the first operation window 1401 is dragged to a position where the area of the hidden part of the first operation window 1401 takes up 20%, 30% or 50% of the total area of the first operation window 1401 (the specific proportion may be set according to the actual requirements, or when the first operation window 1401 is moved to a position where a part of the first operation window 1401 is in the second area 1602.

Further, if the hidden area takes up 20% of the total area of the first operation window 1401, or the distance from the center of the first operation window 1401 to the edge of the display area is less than D1+D2, or the first operation window 1401 is fully moved to the second area 1602, a moving instruction is generated. The moving instruction is in particular an edge adsorbing instruction, and thereby the first operation window 1401 will be adsorbed to the edge of the display area in response to the moving instruction, for example, the first operation window 1401 is fully hidden or only 10% of the first operation window 1401 is displayed, so as to facilitate the user to drag out the first operation window 1401. When the first operation window 1401 is fully hidden, the user is prevented from viewing the first operation window 1401 on the display area; when the operation body clicks in the vicinity of the first operation window 1401, the first operation window 1401 will pop up.

In another example, the moving instruction can be obtained by the following method: for example, the function of edge adsorbing can be activated through an option set in the user interface or a hand gesture operation. When the function of edge adsorbing is activated, a moving instruction is generated. All the display objects on the display area including the first operation window 1401 will be adsorbed to the second area 1602 based on the moving instruction.

Below is a description of the specific implementation process of step 1512.

First example: step 1512 is in particular as follows: judging whether the display position of the second operation window 1403 is beyond the display area; adjusting the display position of the second operation window 1403 when the display position of the second operation window 1403 is beyond the display area, such that the second operation window 1403 is fully displayed on the display area.

Figure 17A:
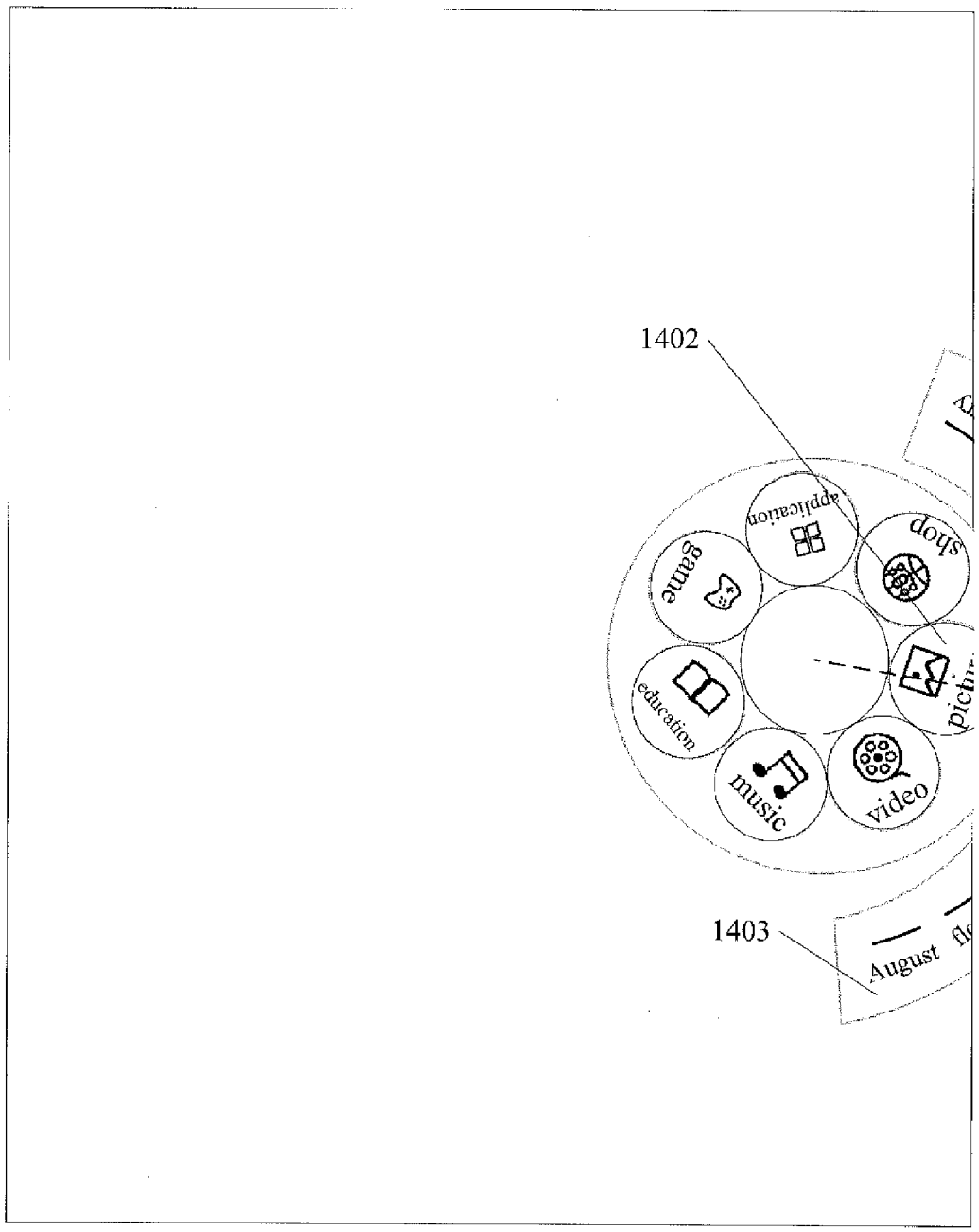
FIG. 17A is a schematic diagram of an embodiment where the display processing method of the embodiments of the present disclosure is applied to an electronic device.

In particular, in a first case, as shown in FIG. 14B, the second operation window 1403 has been displayed on the display area when the first operation window 1401 is in the first area. At this time, for example, the first operation window 1401 is moved to the second area based on the moving instruction in the example described above. As shown in FIG. 17A, most part of the second operation window 1403 will be hidden while a part of the first operation window 1401 is also hidden.

Next, the electronic device judges whether the display position of the second operation window 1403 is beyond the display area. In the example in FIG. 17A, the second operation window 1403 is obviously beyond the display area, and thus the judging result is positive. As a result, the display position of the second operation window 1403 is adjusted, such that the second operation window 1403 is fully displayed in the display area.

In particular, adjusting the display position of the second operation window 1403 may be rotating the first operation window 1401 and the second operation window 1403 simultaneously to keep the relative position of the second operation window 1403 and the $i^{th}$ first operation object unchanged. After the step of adjusting is completed, referring to FIG. 17B, the second operation window 1403 and the first operation window 1401 as a whole are rotated an angle, for example, 170 degrees clockwise. Wherein in FIG. 17B, the $i^{th}$ first operation object, i.e., "picture", is rotated to the outer side of the first operation window 1401, that is, being farthest from the right edge of the display area, then the connecting line between the first operation window 1401 (in particular, the $i^{th}$ first operation object) and the second operation window 1403 is in parallel to the lower edge of the display area; similarly, if the first operation window 1401 is moved to the lower edge of the display area, the above connecting line is in parallel to the right edge of the display area; and if the first operation window 1401 is moved to the position of the four corners of the display area, the above connecting line has a 45-degree angle with the edge of the display area.

Figure 17B:
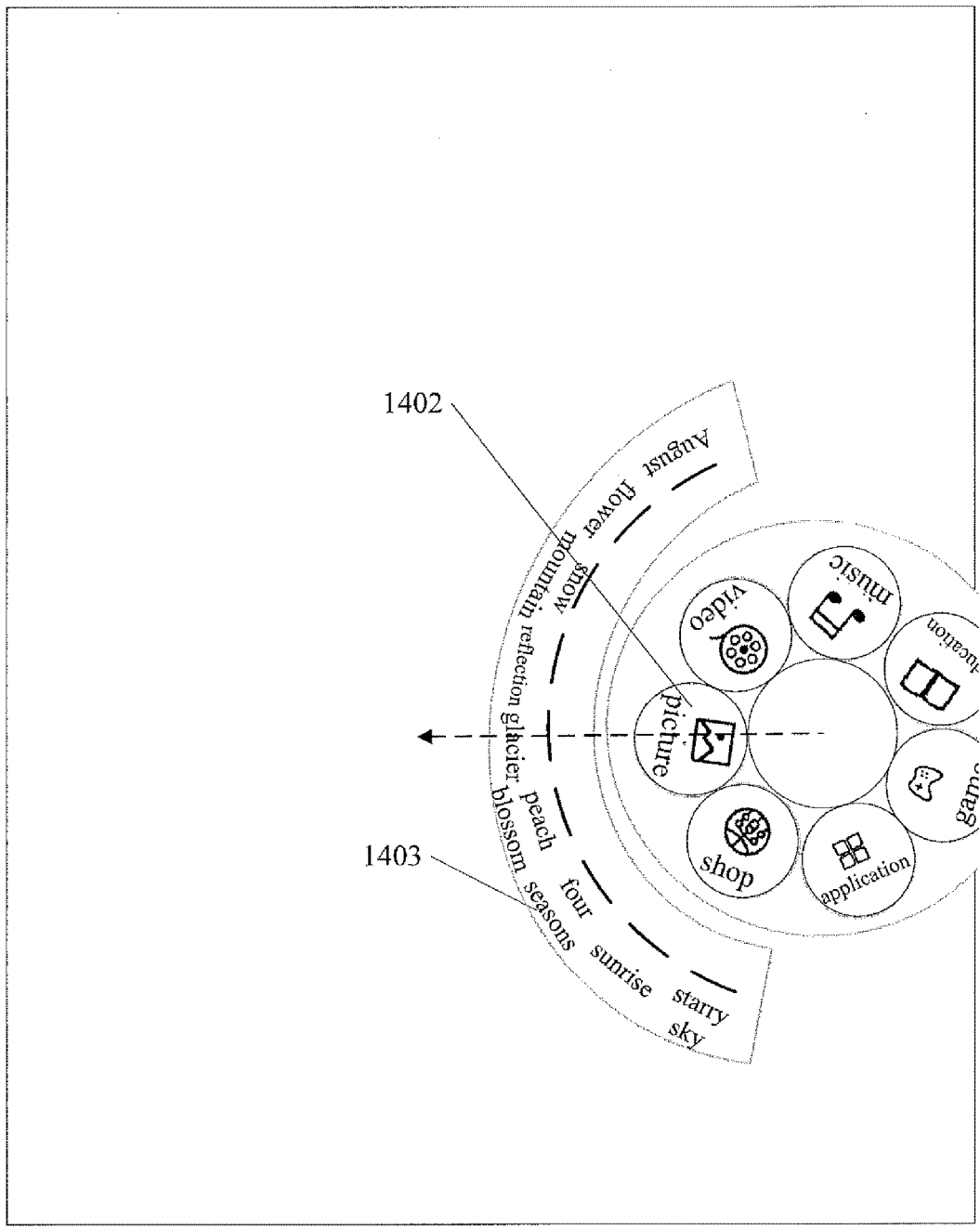
FIG. 17B is a schematic diagram of an embodiment where the display processing method of the embodiments of the present disclosure is applied to an electronic device.

Of course, in FIG. 17B, the $i^{th}$ first operation object can also be rotated to other positions, that is, the above connecting line is not necessary to be in parallel to the edge of the display area.

In addition, in FIG. 17B, the first operation window 1401 is rotated around its center, and of course may be rotated with respect to the right edge of the display area, that is, the rotated first operation window 1401 may be higher than the position (clockwise) or may be lower than the position (anticlockwise) in FIG. 17B.

In a further example, for example, the user presses on the first operation window 1401 by fingers to drag it from the position in FIG. 14B to the position in FIG. 17A. When the fingers of the user leave from the display area, it may be adjusted to the state in FIG. 17B. Therefore, it is a seamless connection for the user, without affecting the use of the user.

Figure 17C:
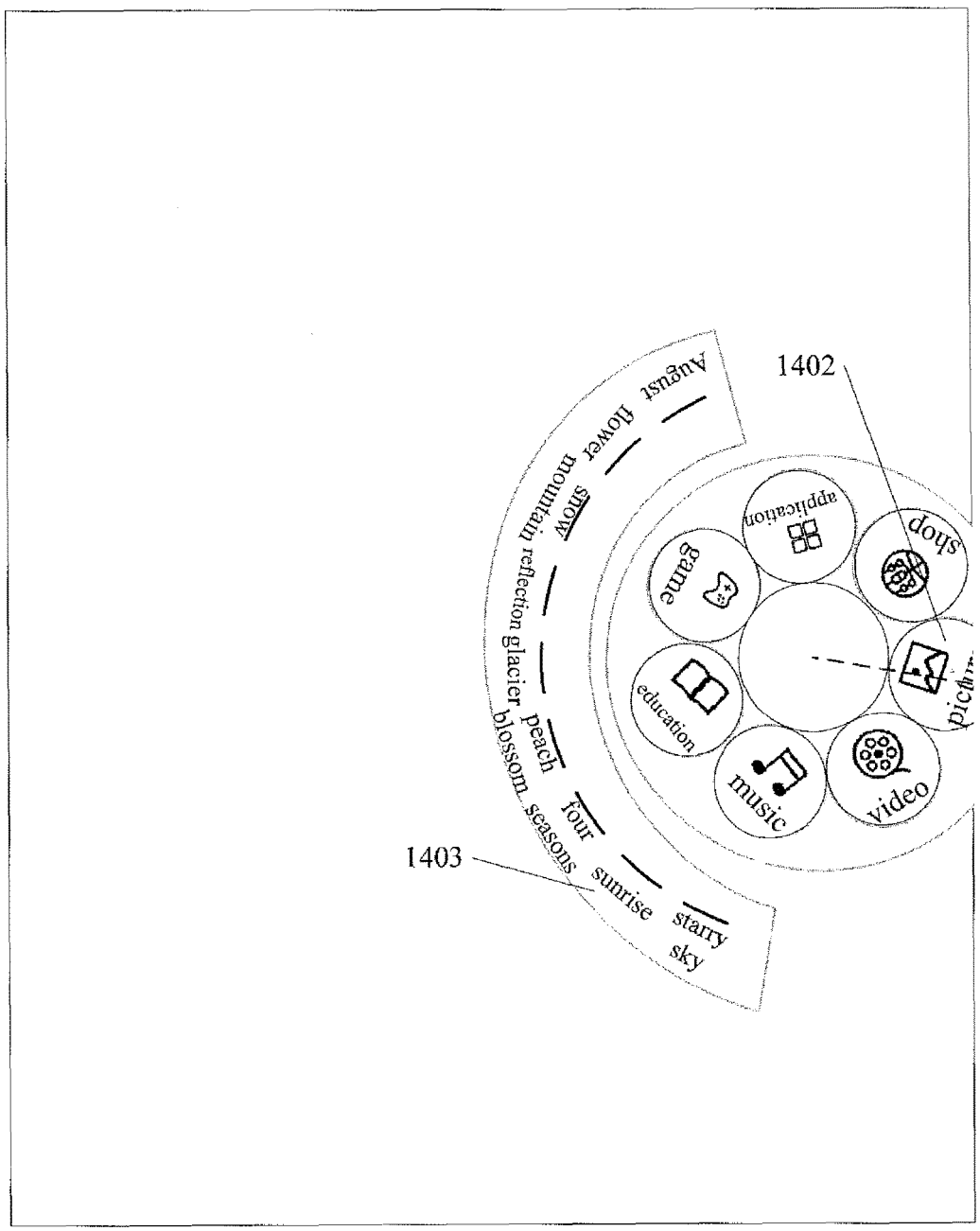
FIG. 17C is a schematic diagram of an embodiment where the display processing method of the embodiments of the present disclosure is applied to an electronic device.

In another example, the display position of the second operation window 1403 is adjusted. In particular, for example, the second operation window 1403 is rotated around the center of the first operation window 1401, and thus the relative position of the second operation window 1403 and the $i^{th}$ first operation object is changed. The state diagram after being adjusted by the method of the embodiment is shown in FIG. 17C. The second operation window 1403 is separately rotated while the first operation window 1401 is not rotated, and thereby the $i^{th}$ first operation object 1402 is still at the position in FIG. 17A, but the second operation window 1403 is moved to the outer side of the first operation window clockwise or anticlockwise, such that the second operation window 1403 is fully displayed in the display area.

In this example, other parts are similar to the case of the first operation window 1401 and the second operation window 1403 being rotated simultaneously, details omitted.

In a second case, the first operation window 1401 is in the first area and the second operation window 1403 is not displayed on the display area, that is, only the first operation window 1401 is displayed on the display area, for example, as shown in FIG. 14A.

Figure 18:
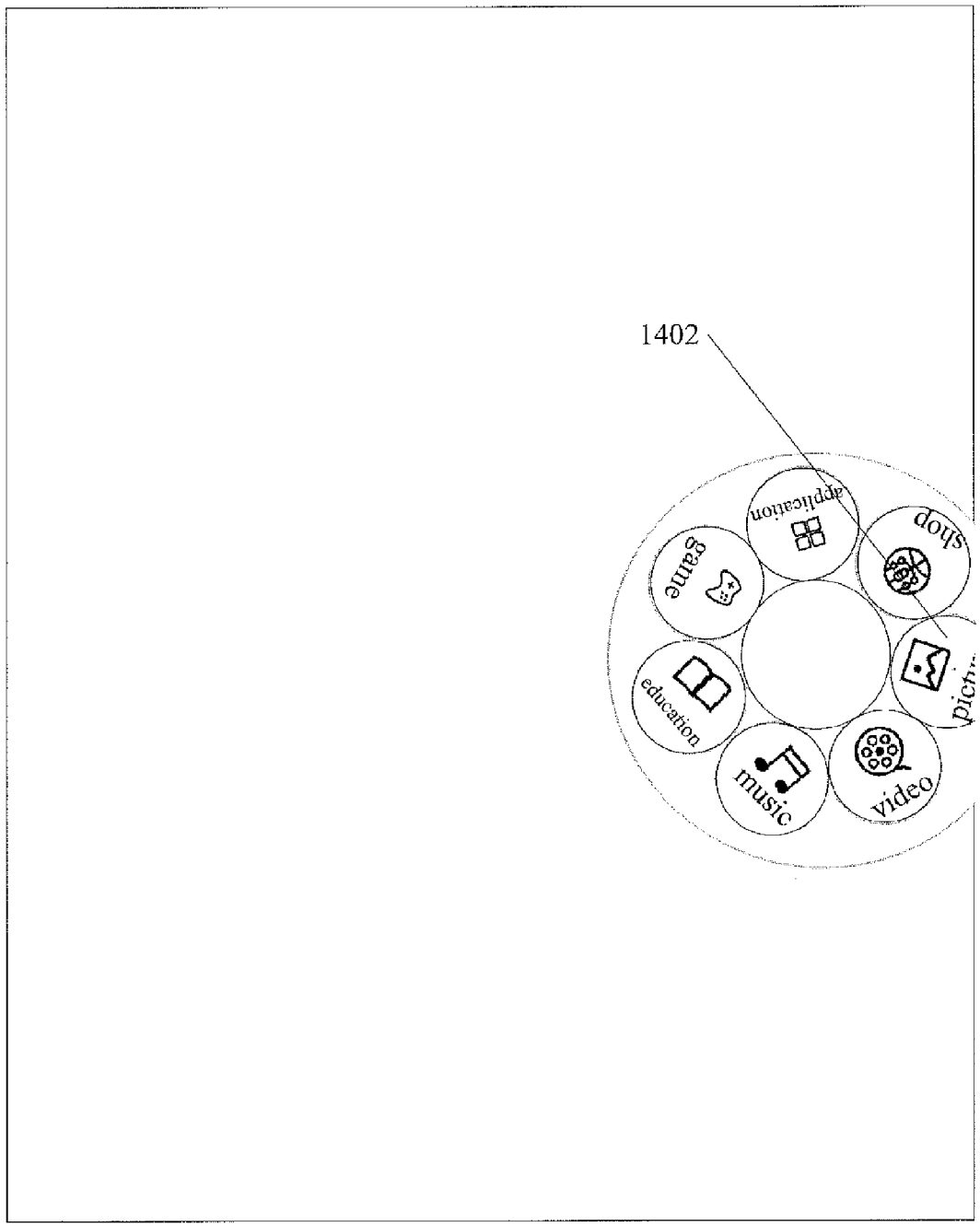
FIG. 18 is a schematic diagram of another embodiment where the display processing method of the embodiments of the present disclosure is applied to an electronic device.

If the first operation window 1401 is moved to the second area based on the moving instruction described in the previous example at this time, a part of the first operation window 1401 is hidden as shown in FIG. 18.

When the user wants to view a picture, the user can click the first operation object through the fingers or a touch pen because there is a part of the first operation object 1402 displayed on the display area. When the electronic device detects the operation, the second operation window can be determined according to the method in the previous embodiment, that is, the second operation window is determined based on the display position and display direction of the first operation object 1402, and the determined position of the second operation window is the position of the second operation window 1403 as shown in FIG. 17A, but the position may not be displayed on the display area; then, it is judged whether the display position of the second operation window is beyond the display area. In this example, the judging result is positive. As a result, next the display position of the second operation window is adjusted, such that the second operation window can be fully displayed on the display area.

The specific adjusting process is similar to the first adjusting method. The positions after being adjusted are as shown in FIG. 17B and FIG. 17C, details omitted herein.

Further, when the first operation is hidden from being clicked, as known from the above description that the first operation window 1401 can be rotated, and thus the user can press on the first operation window 1401 to rotate until the first operation object desired to be operated appears. Then, the object is displayed in the display mode described in the second case.

Second example: step 1512 is in particular as follows: obtaining a first operation; rotating the first operation window in response to the first operation, such that the $i^{th}$ first operation object is moved to a first predetermined position; determining the display position of the second operation window based on the first predetermined position and the display direction of the $i^{th}$ first operation object; displaying the second operation window at the display position, and the display direction of the $q^{th}$ second operation object of the N second operation objects being consistent with the display direction of the $i^{th}$ first operation object, wherein q is an integer equal to or greater than 1 and equal to or less than N.

Figure 19:
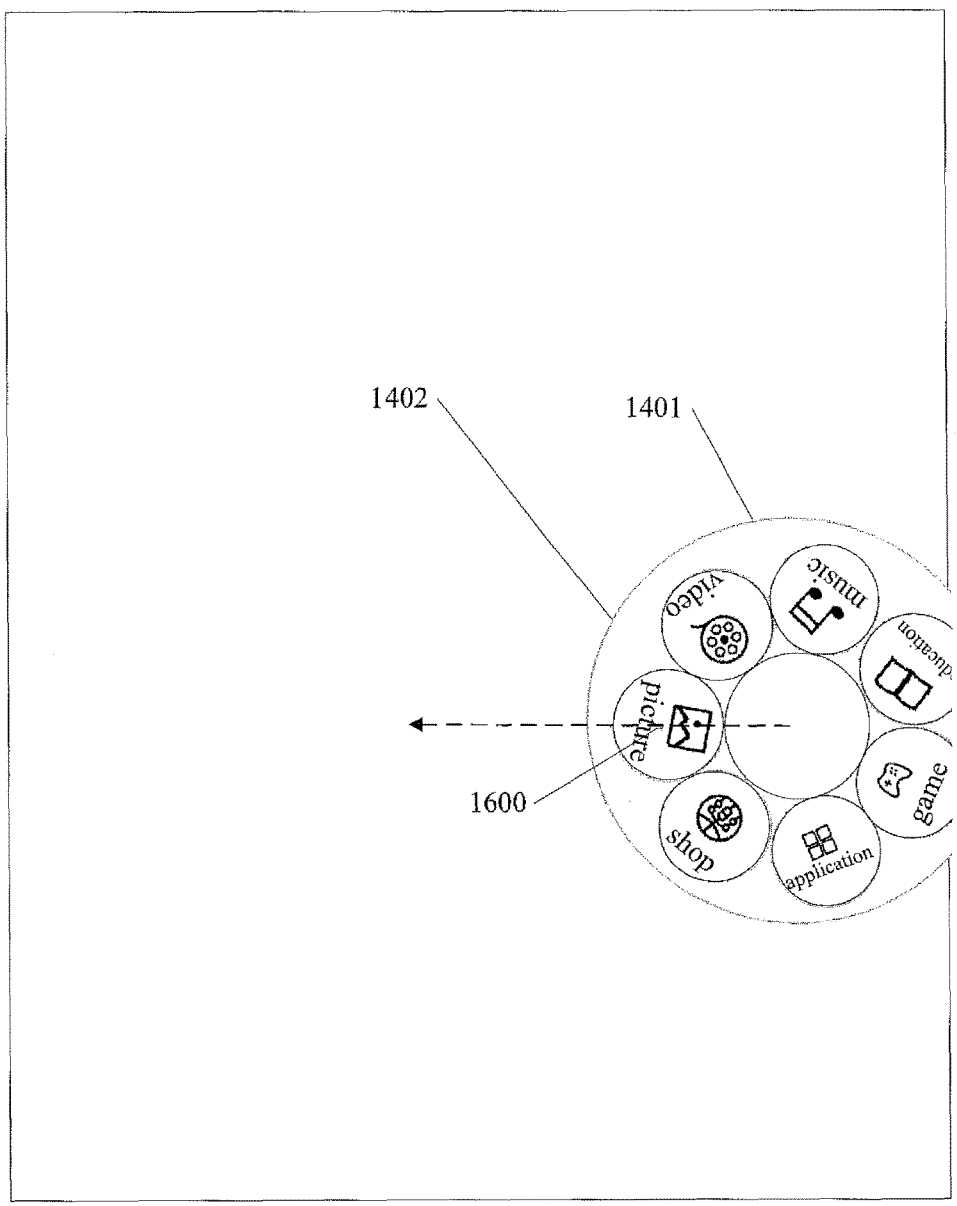
FIG. 19 is another schematic diagram of another embodiment where the display processing method of the embodiments of the present disclosure is applied to an electronic device.

In particular, for example, as shown in FIG. 18, the first operation window 1401 is moved to the second area. At this time, if the user wants to view the picture, the user can rotate the first operation window 1401. When detecting this operation, the electronic device obtains the first operation, rotates the first operation window 1401 in response to the first operation, and then the $i^{th}$ first operation object, i.e., the first operation object 1402, is moved to the first predetermined position. As shown in FIG. 19, the first operation object 1402 is at the first predetermined position 1600, and it is indicated that the first operation object 1402 is selected when the first operation object 1402 is moved to the first predetermined position 1600. Similar to the respective embodiments described above, the user clicks the first operation object 1402 with fingers, and the electronic device selects the first operation object 1402 in response to this operation.

Then, after the first operation object 1402 is selected, the method in the embodiments described above can be utilized, that is, the display position of the second operation window is determined based on the first predetermined position 1600 and the display direction of the first operation object 1402. Then, the second operation window 1403 is displayed at the display position, and the state after being displayed is as shown in FIG. 17B.

Further, the display direction of the $q^{th}$ second operation object in the N second operation objects is consistent with the display direction of the $i^{th}$ first operation object. In this example, for example, the display direction of the second operation object, i.e., "glacier", is consistent with the display direction of the first operation object 1402, that is, the top of both the second operation object, i.e., "glacier", and the first operation object 1402 is directed at the center of the first operation window 1401. Moreover, the center of the second operation object, i.e., "glacier", and the center of the first operation window 1402 are on the same line, i.e., the dotted line as shown in FIG. 19. Of course, in the example, the tops of all the first operation objects and all the second operation objects are directed at the center of the first operation window 1401.

In the above process, except the manner of selecting the $i^{th}$ first operation object being different, others are similar to those in the first display mode.

Further, the connecting line between the first predetermined position 1600 and the center of the first operation window 1401 is in parallel to or has a 45-degree angle with the edge of the display area. In particular, as shown in FIG. 19, the first operation window 1401 is hidden at the right edge of the display area, then the connecting line between the first predetermined position 1600 and the center of the first operation window 1401 is in parallel to the lower edge of the display area; similarly, if the first operation window 1401 is moved to the lower edge of the display area, then the connecting line is in parallel to the right edge; and if the first operation window 1401 is moved to the positions of the four corners of the display area, then the connecting line has a 45-degree angle with the edge of the display area.

Of course, in actual applications, the first predetermined position 1600 may be other positions only if the second operation window corresponding to the $i^{th}$ first operation object can be fully displayed on the display area when the $i^{th}$ first operation object is moved to the first predetermined position.

In another example, even if the second operation window 1403 has been displayed on the display unit when the first operation window 1401 is moved to the second area, the process in the above examples can still be implemented, i.e., rotating the first operation window to move the $i^{th}$ first operation object to the first predetermined position.

The specific implementation mode at step 1510 has been described in detail in the above first and second examples for illustrating. The above is just for illustrating rather than being used to limit the present disclosure. In actual applications, the second operation window can be displayed in other second display modes, such that the second operation window can be fully displayed on the display unit when the first operation window is in the second area of the display unit.

In the above respective examples, the size of the second operation window may be changed according to the change of the number of the second operation objects, that is, the size of the second operation window is consistent with the number of N second operation objects. For example, the second operation window will have the size as shown in FIG. 16B when the number of the second operation objects is only 5 while the second operation window will have the size as shown in FIG. 14B when the number of the second operation objects is 9.

In another example, the size of the second operation window is fixed, for example, the number of the second operation objects being able to be displayed at a time is G, G being an integer equal to or greater than 1, and thereby when N is smaller than G, all the second operation objects can be displayed; when N is greater than G, G second operation objects will be firstly displayed on the second operation window, wherein the G second operation objects can be selected according size, priority or other principles to be displayed on the second operation window, and then it is detected whether there is a specific operation, when the specific operation is detected, the second operation object displayed on the second operation window is adjusted in response to the specific operation, wherein at least one operation object of the adjusted second operation objects is different from the second operation objects displayed on the second operation window before being adjusted.

As still shown in FIG. 14B, assuming that there are 9 second operation objects as shown in FIG. 14B, since only 5 second operation objects can be firstly displayed on the second operation window, for example, the 5 second operation objects as shown in FIG. 16B, the user can utilize his/her fingers to slide upward or downward on the second operation window 1403 when the user wants to view other second operation objects, then the "four seasons" at the top of the second operation window 1403 will be hidden, "flower" will be displayed on the second operation window 1403, and other second operation objects will be moved up in turn.

In another example, the user may utilize an operation body to click in the bank area of the second operation window 1403, the second operation window 1403 will fully take a page turning, that is, all the 5 second operation objects in FIG. 16B will be hidden while the remaining 4 second operation objects will be displayed on the second operation window 1403. The user can switch the page of the second operation window 1403 by clicking.

In the above respective examples, either displaying the first operation window or the second operation window can in particular be displaying at least one of the names and icons of each of the objection objects.

The above respective examples are described by taking the first operation window being a circle area and the second operation window being a fan area as an example. However, they can be designed into other shapes in actual applications, for example, the first operation window may be a rectangle and the corresponding second operation window may be a rectangle; the first operation window may also be an ellipse and the corresponding second operation window may be an arc of an ellipse.

In the above respective examples, when there are a plurality of second operation windows displayed on the display area, the plurality of second operation windows form a control area of a first shape in which extension lines of a first side and a second side being opposite to the first side of each of the second operation windows are converged to a specific point, wherein the specific point is the central point of the first shape, the center of the first operation window being consistent with the central point of the first shape.

The above respective examples are described by taking the file navigating as an example. However, the method in the present embodiment can be also applied to other navigate systems, such as a menu navigate. Then, correspondingly, M first operation objects are M first level menu options, and N second operation objects are N second level menu options, wherein the N second level menu options are a next level menu of the $i^{th}$ first operation object.

In addition, the display processing apparatus according to the embodiments of the present disclosure will be described with reference to FIGS. 14-19. As described above, the display processing apparatus of the embodiments of the present disclosure is applicable to an electronic device such as a panel computer, a smart phone, a notebook computer and the like. That is, the electronic device has a display area being divided into a first area and a second area. An object is to be displayed on the display area.

For example, a first operation window (such as a navigate window) is displayed in the display area, wherein M first operation objects are arranged. The $i^{th}$ first operation object of the M first operation objects corresponds to a second operation window, and there are N second operation objects arranged on the second operation window, wherein M is an integer equal to or greater than 1, N is an integer equal to or greater than 1, and i is an random integer from 1 to M. The object is the second operation window, and the first operation window provides display position information of the object.

The object information acquiring unit acquires content information of the second operation window, and the position information acquiring unit acquires display position information of the second operation window.

The display processing unit controls the second operation window to be displayed in the first display mode when the first operation window is in the first area of the display area and there is a need for displaying the second operation window; the display processing unit controls the second operation window to be displayed in the second display mode when the first operation window is moved from the first area of the display area to the second area of the display area and there is a need for displaying the second operation window, such that the second operation window can be fully displayed on the display area; wherein the first area and the second area are not overlapped.

In an example, the display processing unit judges whether the display position of the second operation window is beyond the display area as described above when the display processing unit controls the second operation window to be displayed in the second display mode; the display processing unit adjusts the display position of the second operation window when the display position of the second operation window is beyond the display area, such that the second operation window is able to be fully displayed on the display area.

In a first case, when the first operation window 1401 is in the first area and the second operation window 1403 has been displayed on the display area, as shown in FIG. 14B, the display processing unit can rotate the first operation window and the second operation window simultaneously and keeps the relative position of the second operation window and the $i^{th}$ first operation object unchanged, or can rotate the second operation window around the center of the first operation window, thus the relative position of the second operation window and the $i^{th}$ first operation object being changed.

In a second case, when the first operation window 1401 is in the first area and the second operation window 1403 is not displayed on the display area, as shown in FIG. 14A, the display processing unit can adjust the display position of the operation window similar to the first case.

In an example, the display processing device further comprises a detecting unit for detecting whether there is a first operation; the display processing device rotates the first operation window in response to the first operation, such that the $i^{th}$ first operation object is moved to a first predetermined position, determines the display position of the second operation window based on the first predetermined position and a display direction of the $i^{th}$ first operation object, and displays the second operation window at the display position, a display direction of a $q^{th}$ second operation object of the N second operation objects being consistent with the display direction of the $i^{th}$ first operation object, wherein q is an integer equal to or greater than 1 and equal to or less than N.

In an example, the display processing unit determines the second operation window based on the display position and display direction of the $i^{th}$ first operation object on the display unit when the display processing unit controls the second operation window to be displayed in the first display mode, and displays the second operation window, the display direction of a $q^{th}$ second operation object of the N second operation objects is consistent with the display direction of the $i^{th}$ first operation object, wherein q is an integer equal to or greater than 1 and equal to or less than N; wherein the display position of the $i^{th}$ first operation object is a first display position and the display direction of the $i^{th}$ first operation object is a first display direction when the first operation window is at a first position of the first area; the display position of the $i^{th}$ first operation object is a second display position and the display direction of the $i^{th}$ first operation object is a second display direction when the first operation window is at a second position of the first area, the first display direction is different from the second display direction.

Figure 20:
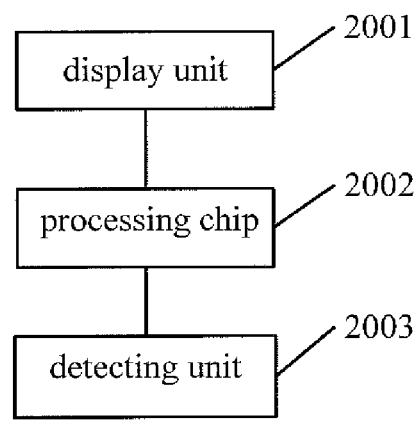
FIG. 20 is a block diagram illustrating functions of an electronic device in an embodiment of the present disclosure.

According to an embodiment of the present disclosure, there is further provided an electronic device as shown in FIG. 20 comprising: a display unit 2001 for providing a display area, wherein a first operation window is displayed on the display area and is arranged with M first operation objects of which the $i^{th}$ first operation object corresponds to a second operation window, and there are N second operation objects arranged on the second operation window, wherein M is an integer equal to or greater than 1, N is an integer equal to or greater than 1, and i is an random integer from 1 to M; a processing chip 2002 connected to the display unit 2001 for controlling the second operation window to be displayed on the display unit 2001 in the first display mode when the first operation window is in the first area of the display unit 2001 and there is a need for displaying the second operation window and controlling the second operation window to be displayed on the display unit 2001 in the second display mode when the first operation window is moved from the first area of the display unit 2001 to the second area of the display unit 2001 and there is a need for displaying the second operation window, such that the second operation window is able to be fully displayed on the display unit 2001.

Wherein the display unit 2001 is in particular a touch display unit, and further is a display unit supporting a multiple-point touch.

The processing chip 2002 is a digital signal processing chip or a central processor chip which can be set on a circuit board of the electronic device.

Further, the processing chip 2002 can be in particular used for controlling the first operation window to be moved from the first area to the second area based on a moving instruction.

In an example, the processing chip 2002 is in particular used for judging whether the display position of the second operation window is beyond the display area of the display unit 2001; adjusting the display position of the second operation window when the display position of the second operation window is beyond the display area of the display unit 2001, such that the second operation window is fully displayed on the display unit 2001.

Further, the processing chip 2002 is in particular used for rotating the first operation window and the second operation window simultaneously and keeping a relative position of the second operation window and the $i^{th}$ first operation object unchanged; or rotating the second operation window around the center of the first operation window, thus the relative position of the second operation window and the $i^{th}$ first operation object being changed.

Further, the electronic device comprises a detecting unit 2003 for detecting whether there is a first operation; the processing chip 2002 rotates the first operation window in response to the first operation, such that the $i^{th}$ first operation object is moved to a first predetermined position, determines the display position of the second operation window based on the first predetermined position and a display direction of the $i^{th}$ first operation object, and displays the second operation window at the display position, a display direction of a $q^{th}$ second operation object of the N second operation objects is consistent with the display direction of the $i^{th}$ first operation object, wherein q is an integer equal to or greater than 1 and equal to or less than N.

Wherein the detecting unit 2003 is in particular a touch unit, for example, a capacitive touch unit or an electromagnetic touch unit, thus being able to detect the operation performed by the user by using the operation body, such as fingers or a touch pen.

Further, the connecting line between the first predetermined position and the center of the first operation window is in parallel to or at a 45-degree angle with the edge of the display unit 2001.

In another example, the processing chip 2002 is in particular used for determining the second operation window based on the display position and display direction of the $i^{th}$ first operation object on the display unit and displaying the second operation window, the display direction of a $q^{th}$ second operation object of the N second operation objects being consistent with the display direction of the $i^{th}$ first operation object, wherein q is an integer equal to or greater than 1 and equal to or less than N; wherein the display position of the $i^{th}$ first operation object is a first display position and the display direction of the $i^{th}$ first operation object is a first display direction when the first operation window is at a first position of the first area; the display position of the $i^{th}$ first operation object is a second display position and the display direction of the $i^{th}$ first operation object is a second display direction when the first operation window is at a second position of the first area, the first display direction being different from the second display direction.

In the above respective examples, the center of the first operation window, the center of the $i^{th}$ first operation object and the center of the second operation window are on the same line.

In particular, the first operation window is a circle area, and the second operation window is a fan area.

In actual applications, M first operation objects are M first level menu options, and N second operation objects are N second level menu options, wherein the N second level menu options are a next level menu of the $i^{th}$ first operation object.

In an example, the processing chip 2002 is in particular used for controlling the size of the second operation window to be consistent with the number of the N second operation objects.

In another example, the size of the second operation window is fixed. The number of the second operation objects being able to be displayed at a time is G, G being an integer equal to or greater than 1, and thereby when N is greater than G, the detecting unit 2003 is in particular used for detecting whether there is a specific operation; the detecting unit 2003 is in particular used for adjusting the second operation object displayed on the second operation window in response to the specific operation, wherein at least one operation object of the adjusted second operation objects is different from the second operation objects displayed on the second operation window before being adjusted.

At least the following technical effects can be realized through one or more examples of the above embodiment of the present disclosure:

In the embodiment of the present disclosure, the first operation window is displayed on the display area and is arranged with M first operation objects. As for the second operation window corresponding to the $i^{th}$ first operation object, and there are N second operation objects arranged on the second operation window; the second operation window is displayed in the first display mode when the first operation window is in the first area of the display unit and there is a need for displaying the second operation window and the second operation window to be displayed in the second display mode when the first operation window is moved from the first area of the display unit to the second area of the display unit and there is a need for displaying the second operation window, such that the second operation window is able to be fully displayed on the display unit. Therefore, even if a first operation object or a second operation window is hidden when the first operation window is moved to the second area, the object can be displayed in the second display mode through the method of the embodiments of the present disclosure, such that the second operation window is able to be fully displayed on the display unit. Therefore, the electronic device is capable of receiving the user's operation through the second operation window, and in turn the user is able to operate the electronic device in a convenient way.

Further, in the embodiments of the present disclosure, when the first operation window is moved from the first area to the second area, and the second operation window has been displayed on the display unit in the first display mode, it is then judged whether the display position of the second operation window is beyond the display area of the display unit, i.e., whether being hidden or not; the display position of the second operation window is adjusted when the display position of the second operation window is beyond the display area of the display unit, such that the second operation window is able to be fully displayed on the display unit. The hidden second operation window can be displayed automatically through the method of the embodiments.

Further, in the embodiments of the present disclosure, adjusting the display position of the second operation window can be in particular rotating the first operation window and the second operation window simultaneously and keeping the relative position of the second operation window and the $i^{th}$ first operation object, which thus can clearly reflect the relationship between the second operation window and the $i^{th}$ first operation object, so as to facilitate the user's operation.

Further, in the embodiments of the present disclosure, the first operation can be obtained when the first operation object is moved to the second area, regardless of whether the second operation window has been displayed on the display unit when the first operation window is moved from the first area to the second area, and the first operation window is rotated in response to the first operation, such that the $i^{th}$ first operation object is moved to the first predetermined position, and then the display position of the second operation window is determined based on the first predetermined position and the display direction of the $i^{th}$ first operation object. The second operation window determined according to the method of the present embodiment can be fully displayed on the display unit.

It needs to be specified that in the present specification, the terms of "comprise", "include" or any other variants intend to cover the meaning of non-exclusive containing, such that the process, method, object or apparatus comprising a series of elements not only comprise those elements but also comprise other elements not explicitly listed, or further comprise inherent elements for the process, method, object or apparatus. In a case of not having more limitations, the element defined by the expression of "comprising a" does not exclude that there are additional same elements in the process, method, object or apparatus comprising the element.

In addition, it needs to be specified that in the present specification, the expressions such as "first . . . unit", "second . . . unit" are just for giving convenience to the descriptions, rather than meaning that it must be implemented as physically-separated two or more units. As a matter of fact, according to the requirements, the unit as a whole may be implemented as one unit, or may be implemented as a plurality of unis.

Last, it further needs to be specified that the series processes not only comprise processes performed in time sequence according to the sequence described herein, but also comprise processes performed concurrently, or respectively, instead of in time sequence.

According to the descriptions of the above implementations, those skilled in the art can clearly know that the present disclosure can be implemented by means of software in combination with necessary hardware platform, and of course it can be implemented only by means of hardware. Based on such understanding, all or part of the distributions made by the technical solutions of the present disclosure to the background art can be reflected in a form of a software product, and the computer software product can be stored in a storage medium such as ROM/RAM, a disk and the like, including several instructions for enabling a computer apparatus (may be a personal computer, a server, or a network apparatus and so on) to perform the method described in respective embodiments or some parts of the embodiments.

In the embodiments of the present disclosure, unit/module can be implemented by software so as to be executed by various types of processors. For example, an identified executable code module can comprise one or more physical or logical blocks of the computer instructions. For example, it can be constructed as an object, a process or a function. In spite of this, it is not necessary for identified executable code module to be physically located together, instead of comprising different instructions stored at different positions. When these instructions are combined together logically, they are composed of a unit/module and achieve a specified purpose of the unit/module.

In a case that the unit/module can be utilized by software, in view of the existing hardware process level, for the unit/module that can be utilized by software, those skilled in the art can construct a corresponding hardware circuit to realize the corresponding function without considering the cost. The hardware circuit comprises a conventional very-large-scale integrated (VLSI) circuit or gate array and existing semiconductors such as logical chip, transistor or other discrete elements. The module can further be realized by using a programmable hardware device such as a field-programmable gate array, a programmable array logic, a programmable logic device and so on.

The above are detailed descriptions of the present disclosure. The present disclosure applies specific examples to explain the principles and implementations of the present disclosure, and the specification for the above embodiments are just used for understanding the method of the present disclosure and its core concept; in the meantime, for those ordinary skilled in the art, changes may be made to the specific implementation and application range according to the concept of the present disclosure. To sum up, the contents of the specification shall not be understood as limitations to the present disclosure. Respective embodiments of the present disclosure are described in detail. However, those skilled in the art should understand that various modifications, combinations or sub-combinations can be made to the embodiments without departing from the principle and scope of the present disclosure, and such modifications, combinations or sub-combinations should be considered as falling into the scope of the present disclosure.

The invention claimed is:

1. A display processing method applicable to an electronic device having a display area being divided into a first area and a second area not overlapped with each other, the first area being a non-edge area of the display area, the second area being an edge area of the display area surrounding the first area, the display processing method comprising:
   acquiring object information of a first object to be displayed;
   detecting a moving operation for moving the first object from the first area to the second area or from the second area to the first area;
   acquiring a destination of the moving operation as display position information of the first object, the display position information indicating the display position of the first object to be displayed is the first area or the second area;
   displaying the first object in the first area or the second area according to the display position information of the first object, wherein displaying the first object in the first area in a first display mode if the display position information corresponds to the first area; and displaying the first object in the second area in a second display mode if the display position information corresponds to the second area, the first display mode being different from the second display mode,
wherein in a case that the moving operation is for moving the first object from the first area to the second area, determining whether a target display position of the first object is in a first subarea of the second area or a second subarea of the second area, the first subarea is a subarea of the second area displaying a second object, the second subarea is a subarea apart from the first subarea of the second area,
if the target display position of the first object is in the second subarea of the second area, the first object being displayed in the first display mode is rotated according to the display position information of the first object in the second subarea of the second area so that only a part of the first object is displayed.

2. The display processing method as claimed in claim 1, wherein in the first display mode, the first object is displayed in the first area with a first display size; and in the second display mode, the first object is displayed in the second area with a second display size, the first display size being larger than the second display size.

3. The display processing method as claimed in claim 1, wherein in the first display mode, a plurality of display elements of the first object are displayed in the first area with a first layout; in the second display mode, at least a part of the plurality of display elements of the first object are displayed in the second area with a second layout; or
in the first display mode, the first object is displayed in the first area in a first operation form; in the second display mode, the first object is displayed in the second area in a second operation form, the number of operable controls included in the first operation form being greater than the number of operable controls included in the second operation form; or
in the first display mode, at least a first part of the first object is displayed in the first area; in the second display mode, at least a second part of the first object is displayed in the second area; the first part being larger than the second part.

4. The display processing method as claimed in claim 1, wherein the second area is subdivided into a first subarea and a second subarea, and when the display position information corresponds to the second area, displaying the first object in the second area in the second display mode comprises:
judging whether the display position information corresponds to the first subarea; and
displaying the first object in the second subarea in the second display mode when it is judged that the display position information corresponds to the first subarea.

5. The display processing method as claimed in claim 1, wherein a first operation window is displayed in the display area and is arranged with M first operation objects of which an $i^{th}$ first operation object corresponds to a second operation window, and there are N second operation objects arranged on the second operation window, wherein M is an integer equal to or greater than 1, N is an integer equal to or greater than 1, and i is a random integer from 1 to M, and wherein the first object to be displayed is the second operation window, and the first operation window provides the display position information of the first object to be displayed, the method comprises:
displaying the second operation window in the first display mode when the first operation window is in the first area of the display unit and there is a need for displaying the second operation window; and
displaying the second operation window in the second display mode when the first operation window is in the second area of the display unit and there is a need for displaying the second operation window, such that the second operation window is able to be fully displayed on the display area; wherein the first area and the second area are not overlapped.

6. The display processing method as claimed in claim 5, wherein the displaying the second operation window in the second display mode comprises:
judging whether a display position of the second operation window is beyond the display area; and
adjusting the display position of the second operation window when the display position of the second operation window is beyond the display area, such that the second operation window is able to be fully displayed on the display area,
wherein the adjusting the display position of the second operation window is:
rotating the first operation window and the second operation window simultaneously and keeping a relative position of the second operation window and the $i^{th}$ first operation object unchanged; or
rotating the second operation window around the center of the first operation window, thus the relative position of the second operation window and the $i^{th}$ first operation object being changed.

7. The display processing method as claimed in claim 5, wherein the displaying the second operation window in the second display mode comprises:
obtaining a first operation;
rotating the first operation window in response to the first operation, such that the $i^{th}$ first operation object is moved to a first predetermined position;
determining the display position of the second operation window based on the first predetermined position and a display direction of the $i^{th}$ first operation object; and
displaying the second operation window at the display position, a display direction of a $q^{th}$ second operation object of the N second operation objects being consistent with the display direction of the $i^{th}$ first operation object, wherein q is an integer equal to or greater than 1 and equal to or less than N.

8. The display processing method as claimed in claim 5, wherein the displaying the second operation window in the first display mode comprises:
determining the second operation window based on the display position and display direction of the $i^{th}$ first operation object on the display unit; and
displaying the second operation window, the display direction of a $q^{th}$ second operation object of the N second operation objects being consistent with the display direction of the $i^{th}$ first operation object, wherein q is an integer equal to or greater than 1 and equal to or less than N;
wherein the display position of the $i^{th}$ first operation object is a first display position and the display direction of the $i^{th}$ first operation object is a first display direction when the first operation window is at a first position of the first area; the display position of the $i^{th}$ first operation object is a second display position and the display direction of the $i^{th}$ first operation object is a second display direction when the first operation window is at a second position of the first area, the first display direction being different from the second display direction.

9. The display processing method as claimed in claim 1, further comprising:
acquiring the user's operation information for the first object; and
performing a first operation corresponding to the operation information in a first operation function set on the first object when the display position information corresponds to the first area; performing a second operation corresponding to the operation information in a second operation function set on the first object when the display position information corresponds to the second area, the first operation function set being different from the second operation function set.

10. The display processing method as claimed in claim 9, wherein functions corresponding to the first operation function set are more than functions corresponding to the second operation function set.

11. A display processing apparatus applicable to an electronic device having a display area being divided into a first area and a second area not overlapped with each other, the first area being a non-edge area of the display area, the second area being an edge area of the display area surrounding the first area, the display processing apparatus comprising:
a processor;
a memory and,
computer coded instructions embodied in the memory and executable by the processor, wherein the computer coded instructions are configured to implement a display processing method, the method comprising:
acquiring object information of a first object to be displayed;
detecting a moving operation for moving the first object from the first area to the second area or from the second area to the first area;
acquiring a destination of the moving operation as display position information of the first object, the display position information indicating the display position of the first object to be displayed is the first area or the second area; and
displaying the first object in the first area or the second area according to the display position information of the first object, wherein displaying the first object in the first area in a first display mode if the display position information corresponds to the first area and displaying the first object in the second area in a second display mode if the display position information corresponds to the second area, the first display mode being different from the second display mode,
wherein in a case that the moving operation is for moving the first object from the first area to the second area, determining whether a target display position of the first object is in a first subarea of the second area or a second subarea of the second area, the first subarea is a subarea of the second area displaying a second object, the second subarea is an area apart from the first subarea of the second area,
if the target display position of the first object is in the second subarea of the second area, the first object being displayed in the first display mode is rotated according to the display position information of the first object in the second subarea of the second area so that only a part of the first object is displayed.

12. The display processing apparatus as claimed in claim 11, wherein in the first display mode, displaying the first object in the first area with a first display size; and in the second display mode, displaying the first object in the second area with a second display size, the first display size being larger than the second display size.

13. The display processing apparatus as claimed in claim 11, wherein
in the first display mode, displaying a plurality of display elements of the first object in the first area with a first layout; in the second display mode, displaying at least a part of the plurality of display elements of the first object in the second area with a second layout;
in the first display mode, displaying the first object in the first area in a first operation form; in the second display mode, displaying the first object in the second area in a second operation form, the number of operable controls included in the first operation form being greater than the number of operable controls included in the second operation form;
in the first display mode, displaying at least a first part of the first object in the first area; in the second display mode, displaying at least a second part of the first object the second area; the first part being larger than the second part.

14. The display processing apparatus as claimed in claim 11, wherein the second area is subdivided into a first subarea and a second subarea, and the display processing method comprises:
judging whether the display position information corresponds to the first subarea when the display position information corresponds to the second area; and
displaying the first object in the second subarea in the second display mode when it is judged that the display position information corresponds to the first subarea.

15. The display processing apparatus as claimed in claim 11, wherein first operation window is displayed in the display area and is arranged with M first operation objects of which an $i^{th}$ first operation object corresponds to a second operation window, and there are N second operation objects arranged on the second operation window, wherein M is an integer equal to or greater than 1, N is an integer equal to or greater than 1, and i is a random integer from 1 to M, and wherein the first object to be displayed is the second operation window, and the first operation window provides the display position information of the first object to be displayed, wherein
controlling the second operation window to be displayed in the first display mode when the first operation window is in the first area of the display unit and there is a need for displaying the second operation window; controlling the second operation window to be displayed in in the second display mode when the first operation window is moved from the first area of the display unit to the second area of the display unit and there is a need for displaying the second operation window, such that the second operation window is able to be fully displayed on the display area; wherein the first area and the second area are not overlapped.

16. The display processing apparatus as claimed in claim 15, wherein the controlling the second operation window to be displayed in the second display mode comprises:
judging whether the display position of the second operation window is beyond the display area; adjusting the display position of the second operation window when the display position of the second operation window is beyond the display area, such that the second operation window is able to be fully displayed on the display area,
wherein adjusting the display position of the second operation window by one of the following manners: rotating the first operation window and the second operation window simultaneously and keeping a relative position of the second operation window and the $i^{th}$ first operation object unchanged; or rotating the second operation window around the center of the first operation window, thus the relative position of the second operation window and the $i^{th}$ first operation object being changed.

17. The display processing apparatus as claimed in claim 15, wherein the display processing method further comprises detecting whether there is a first operation;
controlling the second operation window to be displayed in the second display mode comprises: rotating the first operation window in response to the first operation, such that the $i^{th}$ first operation object is moved to a first predetermined position, determines the display position of the second operation window based on the first predetermined position and a display direction of the $i^{th}$ first operation object, and displaying the second operation window at the display position, a display direction of a $q^{th}$ second operation object of the N second operation objects being consistent with the display direction of the $i^{th}$ first operation object, wherein q is an integer equal to or greater than 1 and equal to or less than N.

18. The display processing apparatus as claimed in claim 15, wherein controlling the second operation window to be displayed in the first display mode comprises: determining the second operation window based on the display position and display direction of the $i^{th}$ first operation object on the display unit; and displaying the second operation window, the display direction of a $q^{th}$ second operation object of the N second operation objects being consistent with the display direction of the $i^{th}$ first operation object, wherein q is an integer equal to or greater than 1 and equal to or less than N; wherein the display position of the $i^{th}$ first operation object is a first display position and the display direction of the $i^{th}$ first operation object is a first display direction when the first operation window is at a first position of the first area; the display position of the $i^{th}$ first operation object is a second display position and the display direction of the $i^{th}$ first operation object is a second display direction when the first operation window is at a second position of the first area, the first display direction being different from the second display direction.

19. The display processing apparatus as claimed in claim 11, wherein the display processing method further comprises:
acquiring the user's operation information for the first object; and
performing a first operation corresponding to the operation information in a first operation function set on the first object when the display position information corresponds to the first area and performing a second operation corresponding to the operation information in a second operation function set on the first object when the display position information corresponds to the second area, the first operation function set being different from the second operation function set.

* * * * *